(12) United States Patent
Smits et al.

(10) Patent No.: US 12,152,135 B2
(45) Date of Patent: Nov. 26, 2024

(54) FILMS MADE OF POLYETHYLENE BLENDS FOR IMPROVED BENDING STIFFNESS AND HIGH MD TEAR RESISTANCE

(71) Applicant: ExxonMobil Chemical Patents Inc., Baytown, TX (US)

(72) Inventors: Marianne F. M. Smits, Mortsel (BE); Ying Zou, Shanghai (CN); Etienne R. H. Lernoux, Longueville (BE); Zhen-Yu Zhu, Shanghai (CN); Xiao-Chuan Wang, Shanghai (CN); Achiel J. M. Van Loon, Antwerp (BE); Maria Josefina Carbone, Testelt (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 332 days.

(21) Appl. No.: 17/904,259

(22) PCT Filed: Mar. 3, 2021

(86) PCT No.: PCT/US2021/020614
§ 371 (c)(1),
(2) Date: Aug. 15, 2022

(87) PCT Pub. No.: WO2021/183337
PCT Pub. Date: Sep. 16, 2021

(65) Prior Publication Data
US 2023/0097375 A1 Mar. 30, 2023

Related U.S. Application Data

(60) Provisional application No. 62/988,577, filed on Mar. 12, 2020.

(51) Int. Cl.
*C08L 23/08* (2006.01)
*B32B 27/08* (2006.01)
*B32B 27/32* (2006.01)

(52) U.S. Cl.
CPC .......... *C08L 23/0815* (2013.01); *B32B 27/08* (2013.01); *B32B 27/32* (2013.01);
(Continued)

(58) Field of Classification Search
CPC ...... C08L 23/0815; C08L 23/06; B32B 27/08; B32B 27/32; B32B 2250/03;
(Continued)

(56) References Cited

U.S. PATENT DOCUMENTS

2012/0100356 A1 4/2012 Ohlsson et al.
2020/0056004 A1 2/2020 Zhu et al.
(Continued)

FOREIGN PATENT DOCUMENTS

WO 2009082546 A2 7/2009
WO 20190027524 2/2019

*Primary Examiner* — James C Yager
(74) *Attorney, Agent, or Firm* — ExxonMobil Technology and Engineering Company

(57) ABSTRACT

Provided herein are monolayer films, and also multilayer films comprising a core, a subskin disposed on the core, and a skin disposed on the subskin. The films may have an Elmendorf tear in MD greater than about 7.0 g/μm, a dart impact greater than about 6.0 g/μm, and a 1% secant modulus greater than about 200 MPa. In multilayer films, the core comprises a first polyethylene blend comprising an ethylene 1-hexene copolymer and a high density polyethylene composition in an amount between about 0 wt. % and about 40 wt. %. Further provided herein are bags and laminates comprising the present films.

20 Claims, 10 Drawing Sheets

(52) U.S. Cl.
CPC ....... *B32B 2250/03* (2013.01); *B32B 2250/24* (2013.01); *B32B 2250/242* (2013.01); *B32B 2270/00* (2013.01); *B32B 2307/546* (2013.01); *B32B 2307/558* (2013.01); *B32B 2307/5825* (2013.01); *B32B 2307/72* (2013.01); *B32B 2307/732* (2013.01); *B32B 2439/06* (2013.01); *Y10T 428/1352* (2015.01)

(58) Field of Classification Search
CPC .......... B32B 2250/24; B32B 2250/242; B32B 2270/00; B32B 2307/546; B32B 2307/558; B32B 2307/5825; B32B 2307/72; B32B 2307/732; B32B 2439/06; B32B 2250/246; B32B 2307/544; B32B 2307/554; B32B 27/30; B32B 2439/02; Y10T 428/1352
See application file for complete search history.

(56) References Cited

U.S. PATENT DOCUMENTS

| | | |
|---|---|---|
| 2020/0369841 A1 | 11/2020 | Lernoux et al. |
| 2021/0260849 A1 | 8/2021 | Tang et al. |
| 2022/0152906 A1 | 5/2022 | Wang et al. |

FILMS MADE OF POLYETHYLENE BLENDS FOR IMPROVED BENDING STIFFNESS AND HIGH MD TEAR RESISTANCE

CROSS-REFERENCE OF RELATED APPLICATIONS

This application is a National Phase Application claiming priority to PCT Application Serial No. PCT/US2021/020614, filed Mar. 3, 2021, which claims the benefit of U.S. Provisional Application 62/988,557, filed Mar. 12, 2020 entitled "Films Made of Polyethylene Blends for Improved Bending Stiffness and High MD Tear Resistance", the entireties of which are incorporated by reference herein.

FIELD OF THE INVENTION

The present disclosure relates to films comprising polyethylene blends, and more particularly relates to films having core layers comprising a polyethylene blend of ethylene 1-hexene copolymer and high density polyethylene.

BACKGROUND OF THE INVENTION

Toughness and stiffness are key properties of polyethylene films, especially where down-gauging is strived. Examples of applications where toughness and stiffness of the film are key include stand up pouches, sachets, pillow packs and heavy-duty sacks. Toughness can be characterized via measurements such as dart impact resistance, Elmendorf tear resistance in the machine direction ("MD Tear") and/or bag integrity after free fall. Stiffness can be characterized by 1% secant modulus (also referred to herein as "modulus")

Few polyethylene compositions are currently available which offer both high MD tear and dart impact in film performance. Even fewer polyethylene compositions offer a favorable combination of the film properties: MD tear, dart impact and secant modulus. Balancing these three film properties through use of polyethylene blends can be difficult. In polyethylene blends, linear low density polyethylene ("LLDPE") is the primary contributor of increased toughness. Increased stiffness, on the other hand, can be attributable to the addition of high density polyethylene ("HDPE") to the blend. Unfortunately, HDPE also decreases the overall toughness (MD tear and dart impact) of the film. Hence, MD tear and dart impact of the film sharply decreases with increasing density of the polyethylene blend while the stiffness or modulus of the film is improved.

A need exists, therefore, for films comprising polyethylene blends that can provide advantageous performance properties, particularly, a combination of high dart impact, high MD tear, and high 1% secant modulus.

SUMMARY OF THE INVENTION

Provided herein are multilayer films having an Elmendorf tear in MD greater than about 7.0 g/µm, a dart impact greater than about 6.0 g/µm, and a 1% secant modulus greater than about 200 MPa. The present multilayer film comprises a core, a subskin disposed on the core, and a skin disposed on the subskin. The core comprises a first polyethylene blend comprising an ethylene 1-hexene copolymer having a density between about 0.914 g/cm$^3$ and about 0.918 g/cm$^3$, a melt index between about 0.50 g/10 min and about 1.0 g/10 min, and a CDBI between about 20% and about 55%, and a high density polyethylene composition having a density between about 0.952 g/cm$^3$ and about 0.965 g/cm$^3$ and a melt index of about 0.70 g/10 min and about 4.0 g/10 min. The subskin comprises a second polyethylene blend comprising the ethylene 1-hexene copolymer. The skin comprises a third polyethylene blend comprising the ethylene 1-hexene copolymer.

In an aspect, the first polyethylene blend comprises between about 60 wt % and about 100 wt % of the ethylene 1-hexene copolymer and between about 0 wt % and about 40 wt % of the high density polyethylene composition. In an aspect, the film has a thickness of about 50 microns.

In an aspect, the present multilayer film has an Elmendorf tear in MD greater than about 12.0 g/µm, a dart impact greater than about 11.0 g/µm, and a 1% secant modulus between about 300 MPa and about 350 MPa. In an aspect, the present multilayer film has an Elmendorf tear in MD greater than about 10.0 g/µm, a dart impact greater than about 21.0 g/µm, and a 1% secant modulus between about 220 MPa and about 260 MPa. In an aspect, the present multilayer film has an Elmendorf tear in MD greater than about 8.0 g/µm, a dart impact greater than about 22.0 g/µm, and a 1% secant modulus between about 300 MPa and about 350 MPa. In an aspect, the present multilayer film has an Elmendorf tear in MD greater than about 10.0 g/µm, a dart impact greater than about 22.0 g/µm, and a 1% secant modulus of about 230 MPa.

Further provided are multilayer films comprising a core, a subskin disposed on the core, and a skin disposed on the subskin where the film has an Elmendorf tear in MD greater than about 7.0 g/µm, a dart impact greater than about 10.0 g/µm, and a 1% secant modulus greater than about 200 MPa. The core comprises a first polyethylene blend comprising between about 60 wt % and about 100 wt % of an ethylene 1-hexene copolymer having a density between about 0.914 g/cm$^3$ and about 0.918 g/cm$^3$, a melt index between about 0.50 g/10 min and about 1.0 g/10 min, and a CDBI between about 20% and about 55% and between about 0 wt % and about 40 wt % of a high density polyethylene composition having a density between about 0.952 g/cm$^3$ and about 0.965 g/cm$^3$ and a melt index of about 0.70 g/10 min and about 4.0 g/10 min. The subskin comprises a second polyethylene blend comprising between about 80 wt % and about 100 wt % of the ethylene 1-hexene copolymer and between about 0 wt % and about 20 wt % of the high density polyethylene composition. The skin comprises a third polyethylene blend comprising between about 80 wt % and about 100 wt % of the ethylene 1-hexene copolymer and between about 0 wt % and about 20 wt % of the high density polyethylene composition.

In an aspect, the multilayer film has an Elmendorf tear in MD greater than about 8.0 g/µm, a dart impact greater than about 22.0 g/µm, and a 1% secant modulus of about 260 MPa. In an aspect, the multilayer film has an Elmendorf tear in MD greater than about 7.0 g/µm, a dart impact greater than about 21.0 g/µm, and a 1% secant modulus of about 210 MPa. In an aspect, the multilayer film has an Elmendorf tear in MD greater than about 7.5 g/µm, a dart impact greater than about 22.0 g/µm, and a 1% secant modulus between about 275 MPa and about 350 MPa. In an aspect, the multilayer film has an Elmendorf tear in MD greater than about 11.0 g/µm, a dart impact greater than about 25.0 g/µm, and a 1% secant modulus of about 345 MPa.

Further provided herein are multilayer films comprising a core, a subskin disposed on the core, and a skin disposed on the subskin and having a thickness of about 40 microns, an Elmendorf tear in MD greater than about 400 g, and a dart impact greater than about 1800 g. The core comprises a first polyethylene blend comprising an ethylene 1-hexene copolymer having a density between about 0.914 g/cm³ and about 0.918 g/cm³, a melt index between about 0.50 g/10 min and about 1.0 g/10 min, and a CDBI between about 20% and about 55% and a high density polyethylene composition having a density between about 0.960 g/cm³ and about 0.961 g/cm³ and a melt index between about 0.7 g/10 min and about 4.0 g/10 min. The subskin comprises a second polyethylene blend comprising the ethylene 1-hexene copolymer. The skin comprises a third polyethylene blend comprising the ethylene 1-hexene copolymer.

Further provided herein are bags comprising a present multilayer film. In an aspect, the present bag has a bending stiffness factor greater than about 150 mm N and a bag drop survival at 5 m is between about 40% and about 80% as measured by ASTM 1709 Method A. In an aspect, the bag comprises about 70 wt % of the high density polyethylene composition and the ethylene 1-hexene copolymer has a density of about 0.916 g/cm³ and a melt index of about 0.50 g/10 min. In an aspect, the bag exhibits an improved bending stiffness factor and bag drop survival at 5 m relative to the same bag made from a linear low density copolymer of substantially similar melt index and density.

Further provided herein are laminates comprising one or more of the present multilayer films and a sealant disposed on the multilayer film. In an aspect, the sealant comprises an ethylene 1-hexene copolymer having a density of about 0.916 g/cm³, a melt index of about 0.50 g/10 min, and a CDBI between about 20% and about 55%.

In an aspect, the present multilayer film has a thickness greater than or equal to 25 microns. In an aspect, the present multilayer film has a thickness between about 25 microns and about 100 microns. In an aspect, the core, subskin, and skin of the multilayer film are co-extruded. In an aspect, the multilayer film comprises, by thickness, about 50% core, about 33.3% subskin, and about 16.7% skin. In an aspect, the core, subskin, and skin comprise 7 or fewer layers in total. In an aspect, the core, subskin, and skin comprise 50 or fewer layers in total. In an aspect, the multilayer film comprises less than or equal to 30 wt. % of the high density polyethylene composition. In an aspect, the multilayer film has a thickness greater than or equal to 25 microns.

DESCRIPTION OF THE PREFERRED EMBODIMENTS

Figure 1:
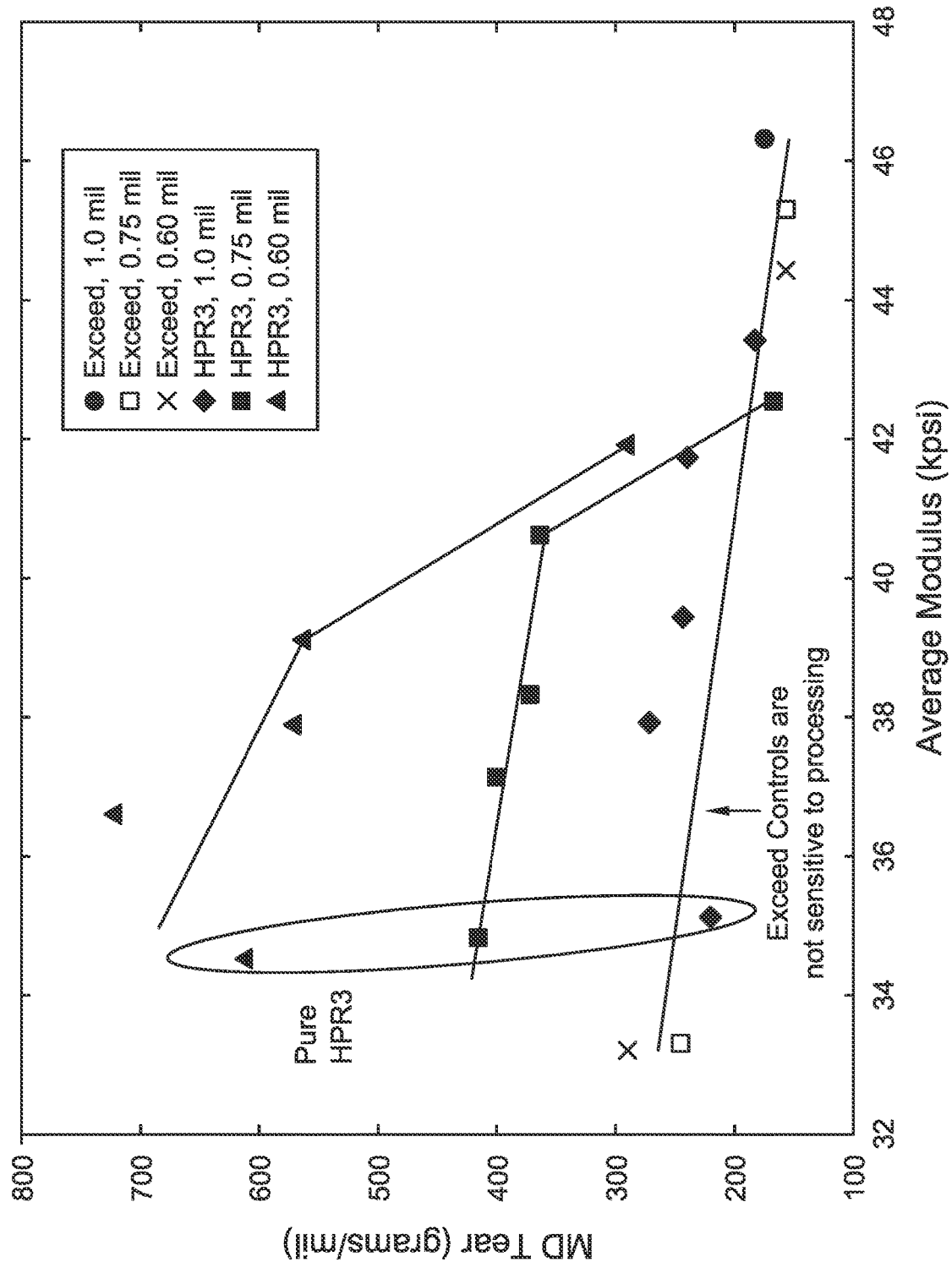
FIG. 1 is a graph showing MD tear (grams/mil) versus average modulus (kpsi) of prior art HPR3/HDPE blends.

Before the present compounds, components, compositions, and/or methods are disclosed and described, it is to be understood that unless otherwise indicated this invention is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

For the purposes of this disclosure, the following definitions will apply:

As used herein, the terms "a" and "the" as used herein are understood to encompass the plural as well as the singular.

The term "alpha-olefin" or "α-olefin" refers to an olefin having a terminal carbon-to-carbon double bond in the structure thereof $(R^1R^2)-C=CH_2$, where $R^1$ and $R^2$ can be independently hydrogen or any hydrocarbyl group. In an aspect, $R^1$ is hydrogen, and $R^2$ is an alkyl group. A "linear alpha-olefin" is an alpha-olefin as defined in this paragraph wherein $R^1$ is hydrogen, and $R^2$ is hydrogen or a linear alkyl group.

The term "average" when used to describe a physical property measured in multiple directions, means the average value of the property in each direction. For example, secant modulus can be measured by straining an object in the machine direction ("MD") or in the transverse direction ("TD"). The "average MD/TD 1% secant modulus" or "average 1% secant modulus" thus refers to the average of the MD secant modulus and the TD secant modulus at 1% strain.

A "catalyst system" as used herein may include one or more polymerization catalysts, activators, supports/carriers, or any combination thereof.

The terms "catalyst system" and "catalyst" are used interchangeably herein.

As used herein, the term "comonomer" refers to the unique mer units in a copolymer. The composition of the copolymer varies at different molecular weights. As with MWD, comonomer composition must be represented as a distribution rather than as a single value. The term "composition distribution," or "comonomer distribution," is a measure of the spread of a copolymer's comonomer composition. Composition distribution is typically characterized as "broad" or "narrow."

The term "composition distribution breadth index" ("CDBI") refers to the weight percent of the copolymer molecules having a comonomer content within 50% of the median total molar comonomer content. The CDBI of any copolymer is determined utilizing known techniques for isolating individual fractions of a sample of the copolymer. Exemplary is Temperature Rising Elution Fraction ("TREF") described in Wild, et al., J. Poly. Sci., Poly. Phys. Ed., Vol. 20, pg. 441 (1982) and U.S. Pat. No. 5,008,204.

As used herein, the term "copolymer" refers to polymers having more than one type of monomer, including interpolymers, terpolymers, or higher order polymers.

The term "$C_n$ group" or "$C_n$ compound" refers to a group or a compound with total number carbon atoms "n." Thus, a $C_m$-$C_n$ group or compound refers to a group or a compound having total number of carbon atoms in a range from m to n. For example, a $C_1$-$C_{50}$ alkyl group refers to an alkyl compound having 1 to 50 carbon atoms.

As used herein, the terms "cyclopentadiene" and "cyclopentadienyl" are abbreviated as "Cp."

All numerical values within the detailed description and the claims herein are modified by "about" or "approximately" the indicated value, taking into account experimental error and variations.

Unless otherwise specified, the term "density" refers to the density of the polyethylene composition or polyethylene blend independent of any additives, such as antiblocks, which may change the tested value.

As used herein, the terms "dispose," "disposed" or "disposed on" mean or refer to location, proximity, juxtaposition or placement of a layer (also referred to herein as a "skin" or a "subskin" or "sealant") to another layer. The terms, dispose, disposed, or disposed on can refer to two or more layers which are attached, extruded, or otherwise combined or, in the alternative, two or more layers which are not attached, extruded or otherwise combined. Further, to dispose or dispose on is not limited to any particular methodology of attachment or placement, but refers simply to the proximity or juxtaposition of one layer in relation to another layer.

As used herein, in reference to Periodic Table Groups of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, multilayer films may be referred to in terms of "layers" (i.e. a first layer, a second layer, a third layer, a core layer, an outer layer, an inner layer, etc.) or in terms of "skins" (i.e. a core, a skin, and a subskin). Layer terminology and skin terminology are interchangeable and convey no functional nor structural differences.

As used herein, the term "linear low density polyethylene" ("LLDPE") means polyethylene having a significant number of short branches. LLDPEs can be distinguished structurally from conventional LDPEs because LLDPEs typically have minimal long chain branching and more short chain branching than LDPEs.

The term "metallocene catalyzed linear low density polyethylene" ("mLLDPE") refers to an LLDPE composition produced with a metallocene catalyst.

The term "linear medium density polyethylene" ("MDPE") refers to a polyethylene having a density from about 0.930 g/cm$^3$ to about 0.950 g/cm$^3$.

As used herein, the term "metallocene catalyst" refers to a catalyst having at least one transition metal compound containing one or more substituted or unsubstituted Cp moiety (typically two Cp moieties) in combination with a Group 4, 5, or 6 transition metal. A metallocene catalyst is considered a single site catalyst. Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system can be supported on a carrier, typically an inorganic oxide or chloride or a resinous material such as, for example, polyethylene or silica. When used in relation to metallocene catalysts, the term "substituted" means that a hydrogen group has been replaced with a hydrocarbyl group, a heteroatom, or a heteroatom containing group. For example, methylcyclopentadiene is a Cp group substituted with a methyl group.

The term "melt index" ("MI") is the number of grams extruded in 10 minutes under the action of a standard load (2.16 kg) and is an inverse measure of viscosity. A high MI implies low viscosity and a low MI implies high viscosity. In addition, polymers can have shear thinning behavior, which means that their resistance to flow decreases as the shear rate increases. This is due to molecular alignments in the direction of flow and disentanglements.

As provided herein, MI ($I_2$) is determined according to ASTM D-1238-E (190° C./2.16 kg), also sometimes referred to as $I_2$ or $I_{2.16}$.

The term "high load melt index" ("HLMI"), is the number of grams extruded in 10 minutes under the action of a standard load (21.6 kg) and is an inverse measure of viscosity. As provided herein, HLMI ($I_{21}$) is determined according to ASTM D-1238 (190° C./21.6 kg) and is also sometimes referred to as $I_{21}$ or $I_{21.6}$.

The "melt index ratio" ("MIR") provides an indication of the amount of shear thinning behavior of the polymer and is a parameter that can be correlated to the overall polymer mixture molecular weight distribution data obtained separately by using Gel Permeation Chromatography ("GPC") and possibly in combination with another polymer analysis including TREF. MIR is the ratio of $I_{21}/I_2$.

The term "melt strength" is a measure of the extensional viscosity and is representative of the maximum tension that can be applied to the melt without breaking. Extensional viscosity is the polyethylene composition's ability to resist thinning at high draw rates and high draw ratios. In melt processing of polyolefins, the melt strength is defined by characteristics that can be quantified in process-related terms and in rheological terms. In extrusion blow molding and melt phase thermoforming, a branched polyolefin of the appropriate molecular weight can support the weight of the fully melted sheet or extruded portion prior to the forming stage. This behavior is sometimes referred to as sag resistance.

As used herein, "$M_n$" is number average molecular weight, "$M_w$" is weight average molecular weight, and "$M_z$" is z-average molecular weight. Unless otherwise noted, all molecular weight units (e.g., $M_w$, $M_n$, $M_z$) including molecular weight data are in the unit of g·mol$^{-1}$.

As used herein, unless specified otherwise, percent by mole is expressed as "mole %," and percent by weight is expressed as "wt. %."

Molecular weight distribution ("MWD") is a measure of the spread of a polymer's molecular weight. A given polymer sample comprises molecules of varying chain length, and thus molecular weight, so the molecular weight of a polymer is represented as a distribution rather than as a single value. MWD is typically characterized as "broad" or "narrow." MWD is equivalent to the expression $M_w/M_n$ and is also referred to as polydispersity index ("PDI"). The expression $M_w/M_n$ is the ratio of $M_w$ to $M_n$. $M_w$ is given by $$M_w = \frac{\sum_i n_i M_i^2}{\sum_i n_i M_i}$$

$M_n$ is given by $$M_n = \frac{\sum_i n_i M_i}{\sum_i n_i}$$

$M_z$ is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, pg. 6812 (2001). The measurements proceed as follows. Gel Permeation Chromatography (Agilent PL-220), equipped with three in-line detectors, a differential refractive index detector ("DRI"), a light scattering (LS) detector, and a viscometer, is used. Experimental details, including detector calibration, are described in: T. Sun, P. Brant, R. R. Chance, and W. W. Graessley, Macromolecules, Volume 34, Number 19, pp. 6812-6820, (2001). Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are about 1.463 g/ml at about 21° C. and about 1.284 g/ml at about 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm. A high temperature Viscotek Corporation viscometer, which has four capillaries arranged in a Wheatstone bridge configuration with two pressure transducers, can be used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$ of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{k M_v^\alpha}.$$

$M_V$ is the viscosity-average molecular weight based on molecular weights determined by LS analysis. Z average branching index ($g'z_{ave}$) is calculated using Ci=polymer concentration in the slice i in the polymer peak times the mass of the slice squared, $Mi^2$. All molecular weights are weight average unless otherwise noted. All molecular weights are reported in g/mol unless otherwise noted. This method is the preferred method of measurement and used in the examples and throughout the disclosures unless otherwise specified. See also, Macromolecules, Vol. 34, No. 19, *Effect of Short Chain Branching on the Coil Dimensions of Polyolefins in Dilute Solution*, Sun et al., pg. 6812-6820 (2001).

As used herein, the term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term olefin includes all structural isomeric forms of olefins, unless it is specified to mean a single isomer or the context clearly indicates otherwise.

As used herein, the term "polymer" refers to a compound having two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically.

As used herein, when a polymer or copolymer is referred to as comprising an olefin, the olefin present in such polymer or copolymer is the polymerized form of the olefin. For example, when a copolymer is said to have a "propylene" content of 35 wt. % to 55 wt. %, it is understood that the mer unit in the copolymer is derived from propylene in the polymerization reaction and said derived units are present at 35 wt. % to 55 wt. %, based upon the weight of the copolymer. A copolymer can be terpolymers and the like.

As used herein, the terms "polymerization temperature" and "reactor temperature" are interchangeable.

The term "substantially uniform comonomer distribution" is used herein to mean that comonomer content of the polymer fractions across the molecular weight range of the ethylene-based polymer vary by <10.0 wt. %. In an aspect, a substantially uniform comonomer distribution refers to <8.0 wt. %, <5.0 wt. %, or <2.0 wt. %.

As used herein, the term "supported" refers to one or more compounds that are deposited on, contacted with, vaporized with, bonded to, incorporated within, adsorbed or absorbed in, or on, a support or carrier. The terms "support" and "carrier" can be used interchangeably and include any support material including, but not limited to, a porous support material or inorganic or organic support materials. Non-limiting examples of inorganic support materials include inorganic oxides and inorganic chlorides. Other carriers include resinous support materials such as polystyrene, functionalized or crosslinked organic supports, such as polystyrene, divinyl benzene, polyolefins, or polymeric compounds, zeolites, talc, clays, or any other organic or inorganic support material and the like, or mixtures thereof.

In an extrusion process, "viscosity" is a measure of resistance to shearing flow. Shearing is the motion of a fluid, layer-by-layer, like a deck of cards. When polymers flow through straight tubes or channels, the polymers are sheared and resistance is expressed in terms of viscosity.

"Extensional" or "elongational viscosity" is the resistance to stretching. In fiber spinning, film blowing and other processes where molten polymers are stretched, the elongational viscosity plays a role. For example, for certain liquids, the resistance to stretching can be three times larger than in shearing. For some polymeric liquids, the elongational viscosity can increase (tension stiffening) with the rate, although the shear viscosity decreased.

As used herein, the "bending stiffness" is a measure of the resistance of film deformation when bent, and can be calculated the by following equation:

$$S_b = \frac{M}{b(1/R)}$$

where $S_b$ is the bending stiffness, measured in mN*mm, M is the moment width, b is the width, and R is the radius of the curvature. Bending stiffness can be measured by applying opposing forces at various points on a beam and measuring the resulting curvature of the beam. For example, in the 3-point method, force is applied in one direction on the ends and in the opposite direction in the center, and the resulting radius of the curvature is measured.

Various measurements described herein may be based on certain standardized testing procedures. For example, measurements of tensile strength in the machine direction (MD) and transverse direction (TD) can be made by following the procedure of ASTM D882. Measurements of yield strength in MD and TD can be made by following the procedure of ASTM D882. Measurements of Elmendorf tear strength in MD and TD can be made by following the procedure of ASTM D1922-09. Measurements for 1% secant modulus can be made by following the procedure of ASTM D790A. Measurements for puncture peak force and puncture break energy can be made by following the procedure of ASTM F1306.

Measurements of dart impact resistance (also referred to herein as "dart drop" or "dart drop impact") can be made using ISO 7765-1, method "A". Gloss measurements in MD and TD can be made by following the procedure of ASTM D523. Light transmission percent (or haze) measurements can be made by following the procedure of ASTM D1003 using a haze meter Haze-Guard Plus AT-4725 from BYK Gardner and defined as the percentage of transmitted light passing through the bulk of the film sample that is deflected by more than 2.5°.

The "secant modulus" is the slope of a line connecting the origin to an object's stress/strain curve at a specified strain percentage. For example, the "1% secant modulus" is the slope of a line connecting the origin to an object's stress/strain curve at 1% strain. The secant modulus describes the overall stiffness of an object. Lower strain percentages typically approximate elastic behavior more accurately. Measurements for 1% secant modulus can be made by following the procedure of ASTM D790A.

The term "tensile strength" refers to the stretching force required to inelastically deform a material. The tensile strength of a material can be measured by stretching the material in MD or TD. Tensile strength is measured in psi and can be tested via ASTM D882.

As described in the examples herein, provided herein are multilayer films comprising a core, a subskin disposed on the core, and a skin disposed on the subskin. The core comprises a first polyethylene blend comprising an ethylene 1-hexene copolymer and a high density polyethylene composition. The ethylene 1-hexene copolymer can have a density of between about 0.914 g/cm³ and about 0.918 g/cm³, a melt index between about 0.50 g/10 min and about 1.0 g/10 min, and a CDBI between about 20% and about 55% The high density composition can have a density of about 0.961 g/cm³ and a melt index of about 0.70 g/10 min. The subskin comprises a second polyethylene blend comprising the ethylene 1-hexene copolymer. The skin comprises a third polyethylene blend comprising the ethylene 1-hexene copolymer. The multilayer film comprises less than or equal to 40 wt. % of the high density polyethylene composition. The multilayer film has an Elmendorf tear in MD greater than about 12.0 g/μm, a dart impact greater than about 11.0 g/μm, and a 1% secant modulus greater than about 300 MPa to 350 MPa.

In an aspect, the first polyethylene blend can comprise ethylene 1-hexene copolymer having a density between about 0.912 g/cm³ and about 0.929 g/cm³, a melt index between about 0.50 g/10 min and about 2.4 g/10 min and a CDBI between about 20% and about 55%. The high density polyethylene composition can have a density of between about 0.952 and about 0.965 g/cm³ and a melt index between about 9.50 g/10 min (measured with 21.6 kg at 190° C.) and about 4 g/10 min (measured with 2.16 kg at 190° C.). In an aspect, the amount of high density polyethylene in the multilayer film is below or equal to a total of 30%. In an aspect, the Elmendorf tear in MD is greater than about 7.0 g/μm, dart impact greater than about 6.0 g/μm, and 1% secant modulus greater than about 180 MPa.

Bag drop resistance measure the ability of a bag to withstand being dropped without breaking or creating spillage and lost product which require manpower to clean. Bag drop resistance is a test of the combined properties: if the seal strength is sufficient, the bag will not break along the seams; if the MD Elmendorf Tear (also referred to as MD tear and/or MD tear resistance) is sufficient, the bag will not break in the machine direction; if the TD Tear is sufficient, the bag will not break in the transverse direction. Puncture resistance and dart drop can impact the filling process. A good combination of these properties is required for a successful packaging material.

Also, the ability to lift the bag and its content is important. For example, when picking up and carrying resin pellets, the bag should not break. The lifting ability of a bag is determined by its MD Tensile Strength at Yield. Also, as described below, tear resistance is important to prevent bags from ripping when caught on sharp or irregular objects. The MD Elmendorf Tear (also referred to as "MD tear" and/or "MD tear resistance" and provided in units of grams and/or g/μm) of a bag is a good measure of its tear resistance. Often resin bags will require a minimum MD Elmendorf Tear of 500 g (100 g/mil) or 3.9 g/μm for a 5 mil gauge film (127 μm film). The higher the MD Elmendorf Tear value, the better the bag quality.

Finally, package integrity is achieved through impact resistance, i.e., fewer bag breaks. Dart drop performance (also referred to as "dart impact" or "dart drop") is a measure of its impact resistance.

Polyethylene Compositions

As described herein, the present polyethylene compositions comprise from about 50.0 mol. % to about 100.0 mol. % of units derived from ethylene. The lower limit on the range of ethylene content can be from 50.0 mol. %, 75.0 mol. %, 80.0 mol. %, 85.0 mol. %, 90.0 mol. %, 92.0 mol. %, 94.0 mol. %, 95.0 mol. %, 96.0 mol. %, 97.0 mol. %, 98.0 mol. %, or 99.0 mol. % based on the mol. % of polymer units derived from ethylene. The polyethylene composition can have an upper limit on the range of ethylene content of 80.0 mol. %, 85.0 mol. %, 90.0 mol. %, 92.0 mol. %, 94.0 mol. %, 95.0 mol. %, 96.0 mol. %, 97.0 mol. %, 98.0 mol. %, 99.0 mol. %, 99.5 mol. %, or 100.0 mol. %, based on mole % of polymer units derived from ethylene.

Further provided herein are polyethylene compositions produced by polymerization of ethylene and, optionally, an alpha-olefin comonomer having from 3 to 10 carbon atoms. Alpha-olefin comonomers are selected from monomers having 3 to 10 carbon atoms, such as $C_3$-$C_{10}$ alpha-olefins. Alpha-olefin comonomers can be linear or branched or may include two unsaturated carbon-carbon bonds, i.e., dienes. Examples of suitable comonomers include linear $C_3$-$C_{10}$ alpha-olefins and alpha-olefins having one or more $C_1$-$C_3$ alkyl branches or an aryl group. Comonomer examples include propylene, 1-butene, 3-methyl-1-butene, 3,3-dimethyl-1-butene, 1-pentene, 1-pentene with one or more methyl, ethyl, or propyl substituents, 1-hexene, 1-hexene with one or more methyl, ethyl, or propyl substituents, 1-heptene, 1-heptene with one or more methyl, ethyl, or propyl substituents, 1-octene, 1-octene with one or more methyl, ethyl, or propyl substituents, 1-nonene, 1-nonene with one or more methyl, ethyl, or propyl substituents, ethyl, methyl, or dimethyl-substituted 1-decene, 1-dodecene, and styrene.

Exemplary combinations of ethylene and comonomers include: ethylene 1-butene, ethylene 1-pentene, ethylene 4-methyl-1-pentene, ethylene 1-hexene, ethylene 1-octene, ethylene decene, ethylene dodecene, ethylene 1-butene 1-hexene, ethylene 1-butene 1-pentene, ethylene 1-butene 4-methyl-1-pentene, ethylene 1-butene 1-octene, ethylene 1-hexene 1-pentene, ethylene 1-hexene 4-methyl-1-pentene, ethylene 1-hexene 1-octene, ethylene 1-hexene decene, ethylene 1-hexene dodecene, ethylene propylene 1-octene, ethylene 1-octene 1-butene, ethylene 1-octene 1-pentene, ethylene 1-octene 4-methyl-1-pentene, ethylene 1-octene 1-hexene, ethylene 1-octene decene, ethylene 1-octene dodecene, and combinations thereof. It should be appreciated that the foregoing list of comonomers and comonomer combinations are merely exemplary and are not intended to be limiting. Often, the comonomer is 1-butene, 1-hexene, or 1-octene.

During copolymerization, monomer feeds are regulated to provide a ratio of ethylene to comonomer, e.g., alpha-olefin, so as to yield a polyethylene having a comonomer content, as a bulk measurement, of from about 0.1 mol. % to about 20 mol. % comonomer. In other aspects the comonomer content is from about 0.1 mol. % to about 4.0 mol. %, or from about 0.1 mol. % to about 3.0 mol. %, or from about 0.1 mol. % to about 2.0 mol. %, or from about 0.5 mol. % to about 5.0 mol. %, or from about 1.0 mol. % to about 5.0 mol. %. The reaction temperature, monomer residence time, catalyst system component quantities, and molecular weight control agent (such as $H_2$) may be regulated so as to provide the polyethylene compositions. For linear polyethylenes, the amount of comonomers, comonomer distribution along the polymer backbone, and comonomer branch length will generally delineate the density range.

Comonomer content is based on the total content of all monomers in the polymer. The polyethylene copolymer has minimal long chain branching (i.e., less than 1.0 long-chain branch/1000 carbon atoms, particularly 0.05 to 0.50 long-chain branch/1000 carbon atoms). Such values are characteristic of a linear structure that is consistent with a branching index (as defined below) of $g'_{vis} \geq 0.980$, 0.985, ≥0.99, ≥0.995, or 1.0. While such values are indicative of little to no long chain branching, some long chain branches can be present (i.e., less than 1.0 long-chain branch/1000 carbon atoms, or less than 0.5 long-chain branch/1000 carbon atoms, particularly 0.05 to 0.50 long-chain branch/1000 carbon atoms).

Generally, polyethylene can be polymerized in any catalytic polymerization process, including solution phase processes, gas phase processes, slurry phase processes, and combinations of such processes. An exemplary process used to polymerize ethylene-based polymers, such as LLDPEs, is as described in U.S. Pat. Nos. 6,936,675 and 6,528,597.

The above-described processes can be tailored to achieve desired polyethylene compositions. For example, comonomer to ethylene concentration or flow rate ratios are commonly used to control composition density. Similarly, hydrogen to ethylene concentrations or flow rate ratios are commonly used to control composition molecular weight.

Polyethylene compositions provided herein can be blended with LLDPE and other polymers, such as additional polymers prepared from ethylene monomers. Exemplary additional polymers are LLDPE, non-linear LDPE, very low density polyethylene ("VLDPE"), MDPE, high density polyethylene ("HDPE"), differentiated polyethylene ("DPE"), and combinations thereof. DPE copolymers include ethylene vinyl acetate ("EVA"), ethylene ethyl acetate ("EEA"), ethylene methyl acetate ("EMA"), ethylene butyl acetate ("EBA"), and other specialty copolymers. The additional polymers contemplated in certain aspects include ethylene homopolymers and/or ethylene-olefin copolymers. The product of blending one or more polyethylene compositions with other polymers is referred to as a polyethylene blend. In an aspect, a polyethylene blend comprises a polyethylene composition blended with a plastomer comprising either an ethylene-butene copolymer or an ethylene-octene copolymer.

Polyethylene compositions can be composed of blended polymers and include at least 0.1 wt. % and up to 99.9 wt. % of LLDPE, and at least 0.1 wt. % and up to 99.9 wt. % of one or more additional polymers, with these wt. % based on the total weight of the polyethylene composition. Alternative lower limits of LLDPE can be 5%, 10%, 20%, 30%, 40%, or 50% by weight. Alternative upper limits of LLDPE can be 95%, 90%, 80%, 70%, 60%, and 50% by weight. Ranges from any lower limit to any upper limit are within the scope of the invention. Preferred blends include more than about 90% LLDPE, and preferably more than about 95% LLDPE. In an aspect, the blends include from 5-85%, alternatively from 10-50% or from 10-30% by weight of LLDPE. The balance of the weight percentage is the weight of the additional and/or other type of polymers, e.g., different LLDPE, LDPE, VLDPE, MDPE, HDPE, DPE such as EVA, EEA, EMA, EBA, and combinations thereof.

The polyethylene compositions can have a density greater than or equal to ("≥") about 0.895 g/cm³, ≥about 0.896 g/cm³, ≥about 0.897 g/cm³, ≥about 0.898 g/cm³, ≥about 0.899 g/cm³, ≥about 0.900 g/cm³, ≥about 0.910 g/cm³, ≥about 0.920 g/cm³, 0.930 g/cm³, ≥about 0.935 g/cm³, ≥about 0.940 g/cm³, ≥about 0.945 g/cm³, ≥about 0.950 g/cm³, ≥about 0.955 g/cm³, and ≥about 0.960 g/cm³. Alternatively, polyethylene compositions can have a density less than or equal to ("≤") about 0.960 g/cm³ about 0.950 g/cm³, e.g., ≤about 0.940 g/cm³, ≤about 0.930 g/cm³, ≤about 0.920 g/cm³, ≤about 0.910 g/cm³, ≤about 0.900 g/cm³ and ≤about 0.890 g/cm³. These ranges include, but are not limited to, ranges formed by combinations any of the above-enumerated values, e.g., from about 0.895 to about 0.960 g/cm³, about 0.900 to about 0.950 g/cm³, about 0.910 to about 0.940 g/cm³, about 0.935 to about 0.950 g/cm³, etc. Density can be determined using chips cut from plaques compression molded in accordance with ASTM D-1928-C, aged in accordance with ASTM D-618 Procedure A, and measured as specified by ASTM D-1505.

The polyethylene compositions can have an MI ($I_2$) according to ASTM D-1238-E (190° C./2.16 kg) reported in grams per 10 minutes (g/10 min), of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, ≥about 0.28 g/10 min, or ≥about 0.30 g/10 min.

Also, the polyethylene compositions can have an MI≤about 3.0 g/10 min, ≤about 2.0 g/10 min, ≤about 1.5 g/10 min, ≤about 1.0 g/10 min, ≤about 0.75 g/10 min, ≤about 0.50 g/10 min, ≤about 0.40 g/10 min, ≤about 0.30 g/10 min, ≤about 0.25 g/10 min, ≤about 0.22 g/10 min, ≤about 0.20 g/10 min, ≤about 0.18 g/10 min, or ≤about 0.15 g/10 min. The ranges, however, include, but are not limited to, ranges formed by combinations any of the above-enumerated values, for example: from about 0.1 to about 5.0; about 0.2 to about 2.0; and about 0.2 to about 0.5 g/10 min.

The polyethylene compositions can have a melt index ratio ("MIR") that is a dimensionless number and is the ratio of the high load MI to the MI, or $I_{21.6}/I_{2.16}$, as described above. The MIR of the polyethylene compositions described herein is from about 25 to about 80, alternatively, from about 25 to about 70, alternatively, from about 30 to about 55, and alternatively, from about 35 to about 50.

The polyethylene compositions can have an orthogonal comonomer distribution. The term "orthogonal comonomer distribution" is used herein to mean across the molecular weight range of the ethylene polymer, comonomer contents for the various polymer fractions are not substantially uniform and a higher molecular weight fraction thereof generally has a higher comonomer content than that of a lower molecular weight fraction. Both a substantially uniform and an orthogonal comonomer distribution may be determined using fractionation techniques such as gel permeation chromatography-differential viscometry ("GPC-DV"), temperature rising elution fraction-differential viscometry ("TREF-DV") or cross-fractionation techniques.

In an aspect, the polyethylene compositions can have at least a first peak and a second peak in a comonomer distribution analysis, wherein the first peak has a maximum at a log ($M_w$) value of 4.0 to 5.4, 4.3 to 5.0, or 4.5 to 4.7; and a TREF elution temperature of 70.0° C. to 100.0° C., 80.0° C. to 95.0° C., or 85.0° C. to 90.0° C. The second peak in the comonomer distribution analysis has a maximum at a log ($M_w$) value of 5.0 to 6.0, 5.3 to 5.7, or 5.4 to 5.6; and a TREF elution temperature of 5.0° C. to 60.0° C. or 10.0° C. to 60.0° C. A description of the TREF methodology is described in U.S. Pat. No. 8,431,661 B2 and 6,248,845 B1.

The present polyethylene compositions typically have a broad composition distribution as measured by CDBI or solubility distribution breadth index ("SDBI"). For details of determining the CDBI or SDBI of a copolymer, see, for example, PCT Patent Application WO 93/03093, published Feb. 18, 1993. Polymers produced using a catalyst system described herein have a CDBI less than 50%, or less than 40%, or less than 30%. In an aspect, the polymers have a CDBI of from 20% to less than 50%. In an aspect, the polymers have a CDBI of from 20% to 35%. In an aspect, the polymers have a CDBI of from 25% to 28%.

Polyethylene compositions are produced using a catalyst system described herein and can have an SDBI greater than 15° C., or greater than 16° C., or greater than 17° C., or greater than 18° C., or greater than 20° C. In an aspect, the polyethylene compositions have an SDBI from 18° C. to 22° C. In an aspect, the polyethylene compositions have an SDBI from 18.7° C. to 21.4° C. In an aspect, the polyethylene compositions have an SDBI from 20° C. to 22° C.

Certain of the present polyethylene compositions are sold under the ENABLE® trademark, including metallocene polyethylene compositions ("Enable® mPE"), which are available from ExxonMobil Chemical Company. ENABLE® mPE polyethylene compositions balance processability and mechanical properties, including tensile strength and elongation to break with advanced drawdown and enhanced pipe rupture (failure) time and toughness. Applications for Enable® products include food packaging, form fill and seal packaging, heavy duty bags, lamination film, stand up pouches, multilayer packaging film, and shrink film.

For example, ENABLE 2005HH polyethylene composition comprises metallocene ethylene 1-hexene copolymers and has a processing aid additive, a thermal stabilizer additive, a density of about 0.920 g/cm$^3$, and an MI (I$_2$) of about 0.5 g/10 min.

Likewise, ENABLE 3505HH polyethylene composition comprises medium density metallocene ethylene-hexene copolymers and has a processing aid additive, a thermal stabilizer additive, a density of about 0.935 g/cm$^3$, and an MI (I$_2$) of about 0.5 g/10 min.

Certain of the present polyethylene compositions are sold under the EXCEED™ and EXCEED XP™ trademarks, including metallocene polyethylene compositions ("EXCEED™ mPE" and "EXCEED XP™ mPE"), which are available from ExxonMobil Chemical Company. EXCEED™ mPE and EXCEED XP™ mPE compositions offer step-out performance with respect to, for example, dart drop impact strength, flex-crack resistance, and machine direction (MD) tear, as well as maintaining stiffness at lower densities. EXCEED™ mPE and EXCEED XP™ mPE compositions also offer optimized solutions for a good balance of melt strength, toughness, stiffness, and sealing capabilities which makes these families of polymers well-suited for blown film/sheet solutions. EXCEED™ polyethylene compositions typically have a CDBI between about 60% and about 80%. EXCEED XP™ polyethylene compositions typically have a CDBI between about 20% and about 55%.

For example, EXCEED XP™ 6026 polyethylene composition comprises LLDPE 1-hexene copolymers and has a processing aid additive, a thermal stabilizer additive, a density of about 0.916 g/cm$^3$, and an MI (I$_2$) of about 0.20 g/10 min.

Likewise, EXCEED XP™ 6056 polyethylene composition comprises LLDPE 1-hexene copolymer and has a processing aid additive, a thermal stabilizer additive, a density of about 0.916 g/cm$^3$, and an MI (I$_2$) of about 0.50 g/10 min.

EXCEED XP™ 8318 polyethylene composition comprises LLDPE ethylene 1-hexene copolymer and has a processing aid additive, a thermal stabilizer additive, a density of about 0.918 g/cm$^3$, and an MI (I$_2$) of about 1.0 g/10 min.

EXCEED XP™ 8358 polyethylene composition comprises ethylene 1-hexene copolymer and has a processing aid additive, a thermal stabilizer additive, a density of about 0.918 g/cm$^3$, and an MI (I$_2$) of about 0.50 g/10 min.

EXCEED XP™ 8656 polyethylene composition comprises ethylene 1-hexene copolymer and has a processing aid additive, a thermal stabilizer additive, a density of about 0.916 g/cm$^3$, and an MI (I$_2$) of about 0.50 g/10 min.

EXCEED XP™ 8784 polyethylene composition comprises ethylene 1-hexene copolymer and has a processing aid additive, a thermal stabilizer additive, a density of about 0.914 g/cm$^3$, and an MI (I$_2$) of about 0.70 g/10 min.

EXCEED™ 1018HA polyethylene composition comprises ethylene 1-hexene copolymer and has a processing aid additive, a thermal stabilizer additive, a density of about 0.918 g/cm$^3$, and an MI (I$_2$) of about 1.0 g/10 min.

Certain of the present linear low density polyethylene compositions are sold under the EXXONMOBIL® trademark, including C4LL 1001, which is available from ExxonMobil Chemical Company. C4LL 1001 is a LLDPE that provides films with good tensile and toughness properties. C4LL 1001 has a density of 0.918 g/cm$^3$, and an MI (I$_2$) of 1.0 g/10 min.

Certain of the present high density polyethylene compositions are sold under the EXXONMOBIL® trademark, including HDPE HMA 014 and HDPE HTA 108, which are available from ExxonMobil Chemical Company. HDPE HMA 014 is a UV stabilized HDPE grade, characterized by dimensional stability, high stiffness and high impact strength. HDPE HMA 014 has a density of 0.960 g/cm$^3$, and an MI (I$_2$) of about 4.0 g/10 min. Similarly, HDPE HTA 108 is a homopolymer HDPE film grade designed to improve stiffness and barrier in coextrusion or in PE blends. When blended with LLDPE or metallocene LLDPE, HDPE HTA 108 improves processability. HDPE HTA 108 has a density of 0.961 g/cm$^3$, and an MI (I$_2$) of about 0.70 g/10 min.

Conventional Catalysts

Conventional catalysts refer to Ziegler Natta catalysts or Phillips-type chromium catalysts. Examples of conventional-type transition metal catalysts are discussed in U.S. Pat. Nos. 4,115,639, 4,077,904 4,482,687, 4,564,605, 4,721,763, 4,879,359 and 4,960,741. The conventional catalyst compounds that may be used in the processes disclosed herein include transition metal compounds from Groups 3 to 10, or Groups 4 to 6 of the Periodic Table of Elements.

These conventional-type transition metal catalysts may be represented by the formula:

$$MR_x$$

where M is a metal from Groups 3 to 10, or Group 4, or titanium; R is a halogen or a hydrocarbyloxy group; and x is the valence of the metal M. In an aspect, x is 1, 2, 3 or 4, or x is 4. Non-limiting examples of R include alkoxy, phenoxy, bromide, chloride and fluoride. Non-limiting examples of conventional-type transition metal catalysts where M is titanium include TiCl$_3$, TiCl$_4$, TiBr$_4$, Ti(OC$_2$H$_5$)$_3$Cl, Ti(OC$_2$H$_5$)Cl$_3$, Ti(OC$_4$H$_9$)$_3$Cl, Ti(OC$_3$H$_7$)$_2$Cl$_2$, Ti(OC$_2$H$_5$)$_2$Br$_2$, TiCl$_3$·⅓AlCl$_3$ and Ti(OC$_{12}$H$_{25}$)Cl$_3$. Conventional chrome catalysts, often referred to as Phillips-type catalysts, may include CrO$_3$, chromocene, silyl chromate, chromyl chloride (CrO$_2$Cl$_2$), chromium-2-ethyl-hexanoate, chromium acetylacetonate (Cr(AcAc)$_3$). Non-limiting examples are disclosed in U.S. Pat. Nos. 2,285,721, 3,242,099 and 3,231,550. For optimization, many conventional-type catalysts require at least one cocatalyst. A detailed discussion of cocatalyst may be found in U.S. Pat. No. 7,858,719, Col. 6, line 46, to Col. 7, line 45.

Metallocene Catalysts

Metallocene catalysts (also referred to herein sometimes as metallocenes or metallocene compounds) are generally described as containing one or more ligand(s) and one or more leaving group(s) bonded to at least one metal atom, optionally with at least one bridging group. The ligands are generally represented by one or more open, acyclic, or fused ring(s) or ring system(s) or a combination thereof. These ligands, the ring(s) or ring system(s), can comprise one or more atoms selected from Groups 13 to 16 atoms of the Periodic Table of Elements; in an aspect, the atoms are selected from the group consisting of carbon, nitrogen, oxygen, silicon, sulfur, phosphorous, germanium, boron and aluminum or a combination thereof. Further, the ring(s) or ring system(s) comprise carbon atoms such as, but not limited to, those cyclopentadienyl ligands or cyclopentadienyl-type ligand structures or other similar functioning ligand structures such as a pentadiene, a cyclooctatetraendiyl, or an imide ligand. The metal atom can be selected from Groups 3 through 15 and the lanthanide or actinide series of the Periodic Table of Elements. The metal is a transition metal from Groups 4 through 12, Groups 4, 5 and 6, and the transition metal is from Group 4.

Exemplary metallocene catalysts and catalyst systems are described in, for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753, 5,770,664; EP-A-0 591 756, EP-A-0 520-732, EP-A-0 420 436, EP-B1 0 485 822, EP-B1 0 485 823, EP-A2-0 743 324, EP-B1 0 518 092; WO 91/04257, WO 92/00333, WO 93/08221, WO 93/08199, WO 94/01471, WO 96/20233, WO 97/15582, WO 97/19959, WO 97/46567, WO 98/01455, WO 98/06759, and WO 98/011144.

Polymerization Processes

The catalysts described above are suitable for use in any olefin pre-polymerization or polymerization process or both. Suitable polymerization processes include solution, gas phase, slurry phase, and a high-pressure process, or any combination thereof. A desirable process is a gas phase polymerization of one or more olefin monomers having from 2 to 30 carbon atoms, from 2 to 12 carbon atoms in an aspect, and from 2 to 8 carbon atoms in an aspect. Other monomers useful in the process include ethylenically unsaturated monomers, diolefins having 4 to 18 carbon atoms, conjugated or nonconjugated dienes, polyenes, vinyl monomers and cyclic olefins. Non-limiting monomers may also include norbornene, norbornadiene, isobutylene, isoprene, vinylbenzocyclobutane, styrenes, alkyl substituted styrene, ethylidene norbornene, dicyclopentadiene and cyclopentene.

In an aspect, a copolymer of ethylene derived units and one or more monomers or comonomers is produced. The one or more comonomers are an α-olefin having from 4 to 15 carbon atoms in an aspect, from 4 to 12 carbon atoms in an aspect, and from 4 to 8 carbon atoms in an aspect. The comonomer can be 1-hexene.

Hydrogen gas is often used in olefin polymerization to control the final properties of the polyolefin, such as described in Polypropylene Handbook 76-78 (Hanser Publishers, 1996). Increasing concentrations (partial pressures) of hydrogen increase the melt flow rate (MFR) and/or MI of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexene or propene. The amount of hydrogen used in the polymerization process is an amount necessary to achieve the desired MFR or MI of the final polyolefin composition. The mole ratio of hydrogen to total monomer ($H_2$:monomer) is in a range of from greater than 0.0001 in an aspect, from greater than 0.0005 in an aspect, from greater than 0.001 in an aspect, to less than 10 in an aspect, less than 5 in an aspect, less than 3 in an aspect, and less than 0.10 in an aspect, wherein a desirable range may comprise any combination of any upper mole ratio limit with any lower mole ratio limit described herein. Expressed another way, the amount of hydrogen in the reactor at any time may range to up to 5000 ppm, up to 4000 ppm in an aspect, up to 3000 ppm in an aspect, between 50 ppm and 5000 ppm in an aspect, and between 100 ppm and 2000 ppm in an aspect.

In a gas phase polymerization process, a continuous cycle is often employed where one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

The ethylene partial pressure can vary between 80 and 300 psia, or between 100 and 280 psia, or between 120 and 260 psia, or between 140 and 240 psia. More importantly, a ratio of comonomer to ethylene in the gas phase can vary from 0.0 to 0.10, or between 0.005 and 0.05, or between 0.007 and 0.030, or between 0.01 and 0.02.

Reactor pressure typically varies from 100 psig (690 kPa) to 500 psig (3448 kPa). In an aspect, the reactor pressure is maintained within the range of from 200 psig (1379 kPa) to 500 psig (3448 kPa). In an aspect, the reactor pressure is maintained within the range of from 250 psig (1724 kPa) to 400 psig (2759 kPa).

Production of Blown Film

Blown film extrusion involves the process of extruding the polyethylene blend (also referred to sometimes as a resin) through a die (not shown) followed by a bubble-like expansion. Advantages of manufacturing film in this manner include: (1) a single operation to produce tubing; (2) regulation of film width and thickness by control of the volume of air in the bubble; (3) high extruder output and haul-off speed; (4) elimination of end effects such as edge bead trim and nonuniform temperature that can result from flat die film extrusion; and (5) capability of biaxial orientation (allowing uniformity of mechanical properties).

As part of the process, a melt comprising the polyethylene blend is mixed with a foaming agent and extruded through an annular slit die (not shown) to form a thin walled tube. Air is introduced via a hole in the center of the die to blow up the tube like a balloon. Mounted on top of the die, a high-speed air ring (not shown) blows onto the hot film to cool it. The foam film is drawn in an upward direction, continually cooling, until it passes through nip rolls (not shown) where the tube is flattened to create what is known as a 'lay-flat' tube of film. This lay-flat or collapsed tube is then taken back down the extrusion tower (not shown) via more rollers. For high output lines, air inside the bubble may also be exchanged. The lay-flat film is either wound or the edges of the film are slit off to produce two flat film sheets and wound up onto reels to produce a tube of film. For lay-flat film, the tube can be made into bags, for example, by sealing across the width of film and cutting or perforating to make each bag. This operation can be performed either in line with the blown film process or at a later time. The blown film extrusion process is typically a continuous process.

In coextrusion lines, the number of extruders depends on the number of different materials being extruded and not necessarily on the number of layers. Current feedblock technology allows fluid flow from one extruder to be split into two or more layers in the coextrudate. In an aspect, a coextrusion feedblock arranges the different melt streams in a predetermined layer sequence and generates a melt stream for each layer. Each melt stream then meets its neighboring layers and a final planar coextrudate is formed. The coextrusion feedblock can be fixed or have variable geometry blocks. A flat die, and the synergy between the die and the feedblock, are crucial to high quality film production. The die must spread the coextrudate received from the feedblock while maintaining flatness of the film. The die requires a sufficiently short residence time in order to prevent heat transfer between layers or polymer degradation. The die must also be sufficiently strong so as to resist deformation when subjected to high pressures inherent in thin film processes. In an aspect, the present multilayer films have 7 total layers or fewer. In an aspect, the present multilayer films have 50 total layers or fewer.

Laminates

The present films can be laminated to a sealant forming a laminate with desired physical properties while maintaining the optical properties of the present films. A laminate includes a sealant disposed on the present films. The sealant may include one or more layers of a polyethylene composition. Lamination may be accomplished through any suitable method, such as extrusion lamination, heat-sealing, wet lamination or adhesive lamination.

The sealant can include a first layer, a second layer disposed on the first layer, and a third layer disposed on the second layer. Each of the first layer, the second layer, and the third layer includes a polyethylene composition, optionally mixed with a second or third polyethylene composition or other polymers or additives. A sealant may have a 1/2/3 structure where 1 is a first layer, 2 is a second layer, and 3 is a third layer (e.g. a sealant layer) disposed on a film. The second layer is disposed between the first layer and the third layer. The first layer can be an outermost layer forming a film laminate surface.

For the sealant films of a three-layer structure, the first layer, the second layer, and the third layer may be of equal thickness or alternatively the second layer may be thicker than each of the first layer and the third layer. The polyethylene composition of the first layer and the polyethylene composition of the second layer may be the same or different. Either the polyethylene composition of the first layer or the polyethylene composition of the second layer may have a higher or lower density than that of the polyethylene composition of the third layer.

It has been discovered that the combination of alpha-olefin copolymers in layers of a sealant may significantly improve the mechanical properties of a laminate film over previous films. For example, at a given overall film stiffness resulting from a predetermined overall film density, bag drop test non-breakage rate (method A or B) of the laminate film can be greatly strengthened by addition of alpha-olefin copolymers in the sealant, while other mechanical properties, including dart impact, and tear strength, can remain at a comparable level or also improve. As a result, the laminate film can provide a convenient and cost-effective alternative to current options for film packages where well-balanced overall film performance is expected. Since films and laminates based in a single class of resin are more easily recycled in a single collection stream, laminate films made primarily from ethylene provide the advantage of easier recycling capability.

It is to be understood that while the invention has been described in conjunction with the specific embodiments thereof, the foregoing description is intended to illustrate and not limit the scope of the invention. Other aspects, advantages, and modifications will be apparent to those skilled in the art to which the invention pertains.

Therefore, the following examples are put forth so as to provide those skilled in the art with a complete disclosure and description and are not intended to limit the scope of that which the inventors regard as their invention.

Example 1

Prior Art Polyethylene Blends HPR3/HDPE

Efforts have been made to increase stiffness of films while maintaining high MD tear and dart impact. These approaches included broad composition distribution ("BCD") and broad orthogonal composition distribution ("BOCD") polyethylene blends having mLLDPE compositions such as EXCEED™ products. Moderate improvements in machine direction Elmendorf tear and dart impact were made as shown in Table 1.

TABLE 1

Film Properties using Prior Art Polyethylene Compositions and Blends EXCEED ™ 1018CA, EXCEED ™ 1327CA, BCD and BOCD

| Composition | EC1018CA 100% | EC1327CA 100% | BCD 52.4% (0.895, 1 MI), 47.6% (0.956, 1 MI) | BOCD 80% (0.916, 0.3 MI), 20% (0.972, 200 MI) |
|---|---|---|---|---|
| MD Tear (g/mil) | 249 | 147 | 382 | 218 |
| TD Tear (g/mil) | 416 | 437 | 613 | 564 |
| DDT (g/mil) | 487 | 136 | 332 | 432 |
| 1% Secant Modulus (kpsi) | 25.9 | 46.4 | 44.7 | 48.4 |

LLDPE compositions (i.e., "HPR3") catalyzed by hafnium-based metallocenes have been developed by Univation to provide a unique balance of film properties including MD tear, transverse direction tear (TD Tear) and dart drop impact with stiffness similar to Z-N LLDPE. These polyethylene compositions also demonstrated processability similar to Z-N LLDPE. However, unique molecular characteristics of the polyethylene compositions, such as broad composition distribution and molecular weight distribution, do not manifest at higher densities. Film properties of polyethylene compositions such as HPR3 were similar to films made with the EXCEED™ compositions. Nevertheless, the excellent tear and impact balance of low density polyethylene compositions offer a comparative baseline for the present polyethylene blend approach.

We blended 90~95% the HPR3 polyethylene composition with 5~10% high density polyethylene compositions. The resultant polyethylene blends (referred to in this example as "HPR3/HDPE") displayed a relatively high MD tear and dart impact with increased modulus. More specifically, we prepared two different polyethylene blends of HPR3 (0.919 g/cm$^3$ density, 0.7 MI) with 5 wt. % and 10 wt. % of a metallocene catalyzed high density polyethylene composition (0.972 g/cm³ density, 200 MI) and another two polyethylene blends of HPR3 with 5 and 10% of a separate metallocene catalyzed high density polyethylene composition (0.965 g/cm³ density, 20 MI, respectively). The polyethylene blends were prepared using a twin screw extruder and processed subsequently in a pilot-scale Gloucester blown film line. Monolayer films of 1.0 mil, 0.75 mil and 0.6 mil thickness were fabricated.

Figure 2:
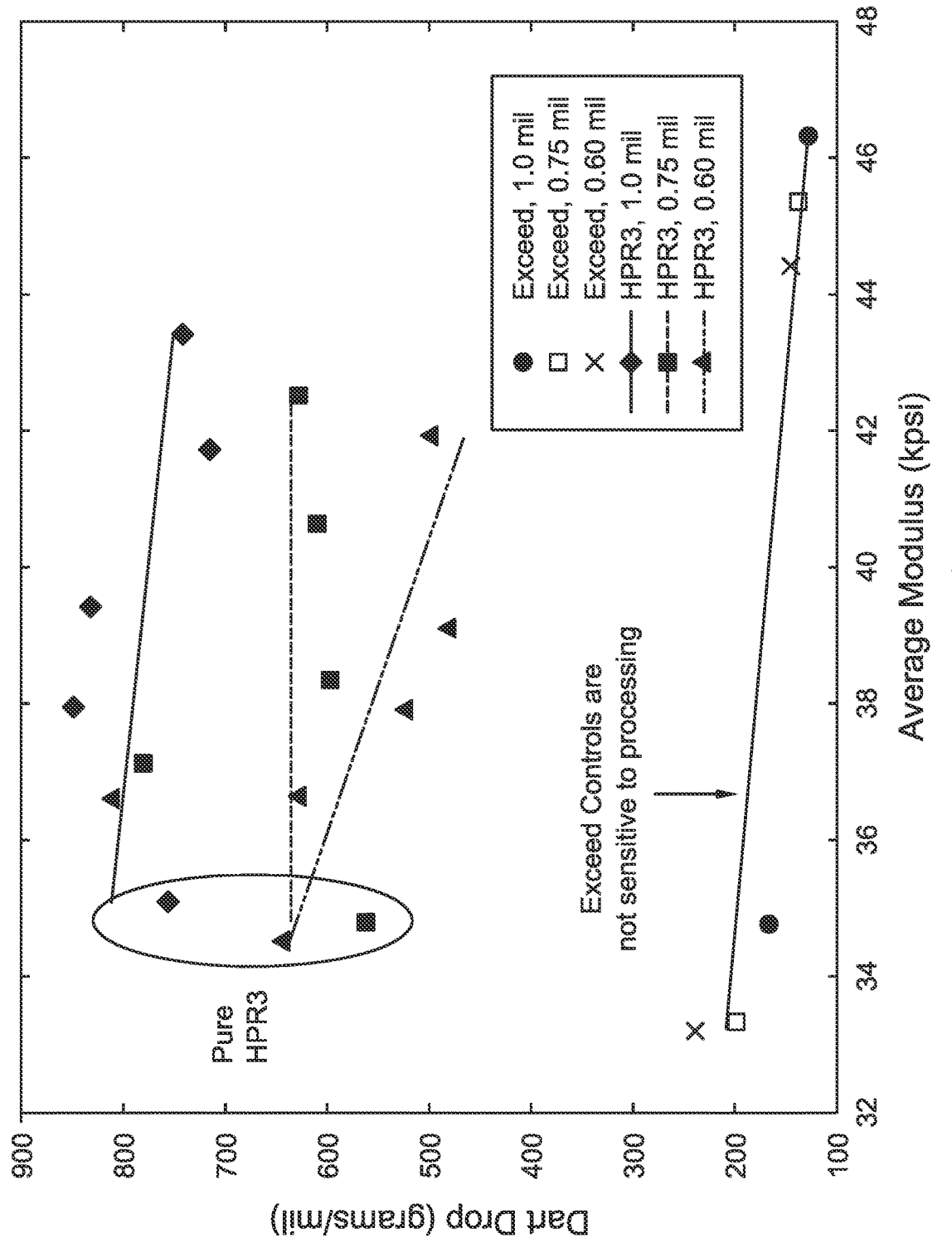
FIG. 2 is a graph showing dart impact (grams/mil) versus average modulus (kpsi) of prior art HPR3/HDPE blends.

As shown in FIGS. 1 and 2, MD tear and dart impact of the resultant films were plotted against average 1% secant modulus with neat HPR3 and EXCEED™ controls. Each of the polyethylene blends showed substantial improvement in film modulus relative to neat HPR3. 0.75 and 0.6 mil gauge films of 10% (0.965 g/cm³, 20 MI) polyethylene blend achieved excellent combination of high MD tear, high dart impact and high modulus.

Figure 3:
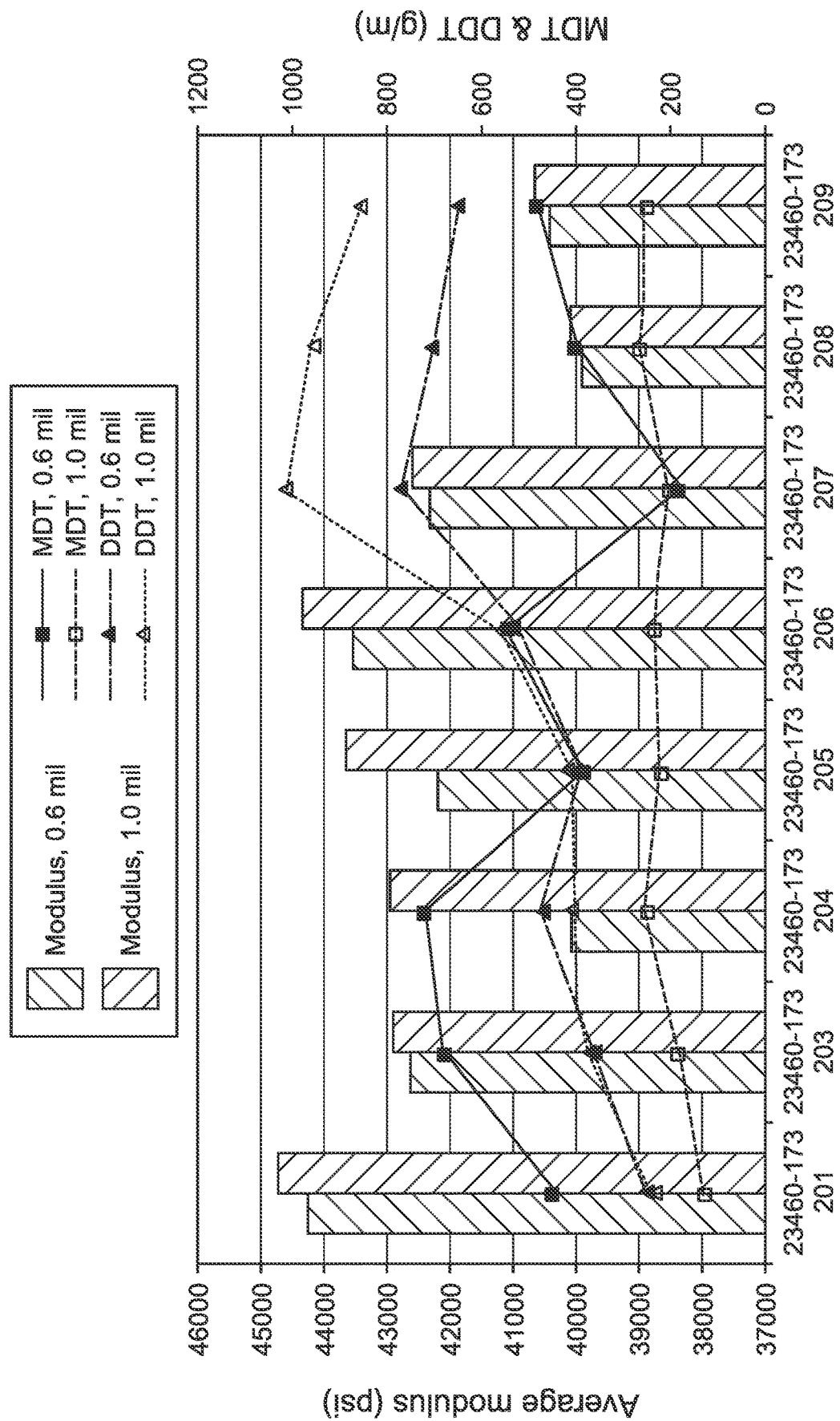
FIG. 3 are bar graphs of film properties of prior art HPR3/HDPE blends having 10 wt % of HDPE (0.965 density, 20 Melt Index (MI)) at various conditions.

We further analyzed performance of HPR3 (0.919 g/cm3 density, 0.7 MI) with 10% metallocene catalyzed high density polyethylene composition (0.965 g/cm³ density, 20 MI). Films were fabricated under different processing conditions with varying throughput, die gap/blow-up ratio and melt temperature shown in Tables 2A and 2B below. As shown in FIG. 3, the polyethylene blends appeared sensitive to processing conditions which introduced different film morphologies. However, the combination of high MD tear, high dart impact and high secant modulus could be achieved at optimized fabrication conditions.

This work demonstrated that the monolayer films can have an Elmendorf tear in MD greater than about 200 g/mil, a dart impact greater than about 500 g/mil, and a 1% secant modulus between about 34 kpsi and about 44 kpsi. These films were made of polyethylene blends having between about 60 wt % and about 100 wt % of an ethylene 1-hexene copolymer and a density between about 0.914 g/cm³ and about 0.918 g/cm³ and a melt index between about 0.50 g/10 min and about 1.0 g/10 min, and between about 0 wt % and about 40 wt % of a high density polyethylene composition having a density of about 0.961 g/cm³ and a melt index of about 0.70 g/10 min.

TABLE 2A

| Processing Conditions | | | | |
|---|---|---|---|---|
| Processing Conditions | 23460-173201 | 23460-173203 | 23460-173204 | 23460-173205 |
| Output (lb/hr/in) | 12 | 8 | 8 | 10 |
| BUR/Die gap | 2.0/60 | 2.0/60 | 2.0/60 | 2.5/60 |
| Melt Temp (° F.) | 410 | 439 | 411 | 425 |
| FLH (in) | 29 | 25 | 24 | 26 |

TABLE 2B

| Processing Conditions | | | | |
|---|---|---|---|---|
| Processing Conditions | 23460-173206 | 23460-173207 | 23460-173208 | 23460-173209 |
| Output (lb/hr/in) | 12 | 12 | 8 | 8 |
| BUR/Die gap | 3.0/45 | 3.0/45 | 3.0/45 | 3.0/45 |
| Melt Temp (° F.) | 411 | 440 | 441 | 412 |
| FLH (in) | 26 | 42 | 22 | 19 |

Example 2

MD Tear Resistance

In this example, we prepared multilayer films of various thicknesses. Each film had a core made of a polyethylene blend comprising about 30 wt. % of a high density polyethylene composition (HTA 108 or HMA 014).

When the core of the coextruded multilayer film comprised the polyethylene blend of about 30 wt. % high density polyethylene composition (HTA 108 or HMA 014) and about 70 wt. % EXCEED XP™ 8656, MD tear resistance of the multilayer film increased to 10.26 g/µm to 13.24 g/µm. As shown in Table 3 below, the skin and subskin of these multilayer films comprised EXCEED XP™8656.

TABLE 3

| | Multilayer Films | | |
|---|---|---|---|
| Sample No. | 100% EXCEED XP ™ 8656A | 6 | 1E |
| Target thickness (µm) | 40 | 40 | 40 |
| Layers 1 & 2 (external) | 100% EXCEED XP ™ 8656A | 100% EXCEED XP ™ 8656A BPEP | 100% EXCEED XP ™ 8656A |
| Layer 3 (core) | 100% EXCEED XP ™ 8656A | 70% EXCEED XP ™ 8656A BPEP + 30% HTA 108 | 70% EXCEED XP ™ 8656A 30% HMA 014 |
| Layer 4 & 5 Internal (Sealant) | 100% EXCEED XP ™ 8656A | 100% EXCEED XP ™ 8656A BPEP | 100% EXCEED XP ™ 8656A |
| Dart drop (g) | >1995.8* | 1806.8 | >1995.8* |
| Elmendorf Tear MD (g) | 291.6 | 409.12 | 533.16 |
| Elmendorf Tear MD, normalized (g/µm) | 7.18 | 10.26 | 13.24 |

*Max of equipment

Coextruded films having the core made of polyethylene blends of high density polyethylene and EXCEED XP™ 8656 showed a positive synergy, having similar or slightly higher MD tear resistance for the same. The MD tear resistance of the films gradually increased as the gauge increased between 25 and 100 µm. Conversely, pure EXCEED XP™ 8656 films had very low MD tear resistance at 40 µm (about 7.5 g/µm).

Example 3

Thinner Films

Coextruded films were made with a layer distribution of 1/2/6/2/1 (to mimic 1/2/1). The layer distribution of 1/2/6/2/1 means the film comprises about 50% core, about 33.3% subskin, and about 16.7% skin, each by thickness. Each coextruded film had an overall thickness of 25 µm. The films were made of polyethylene blends comprising 0 wt. % to 40 wt. % high density polyethylene composition, HTA 108, in the core.

Figure 4:
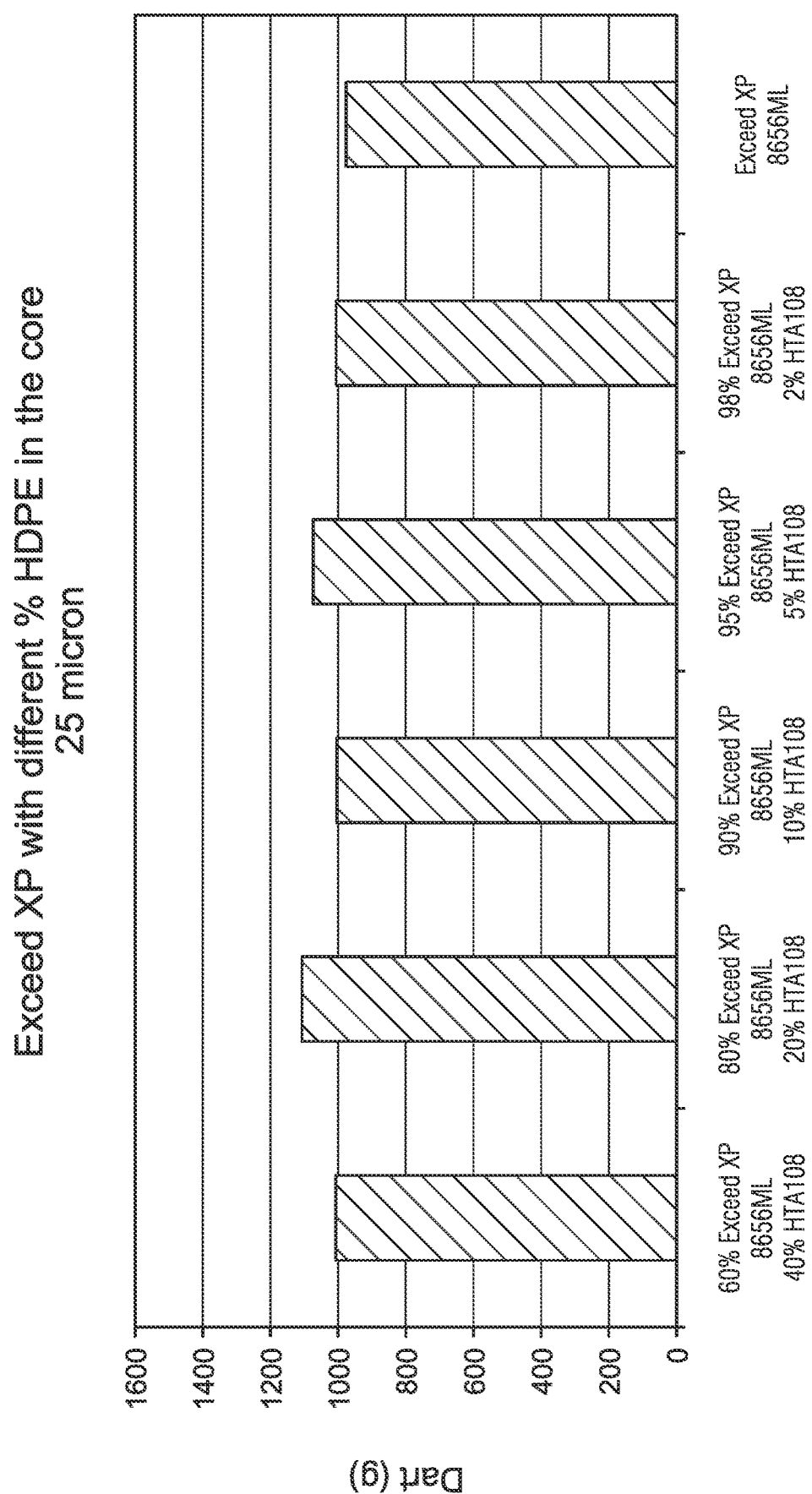
FIG. 4 are bar graphs showing that the dart impact is not decreased in 25 μm films comprising a core layer made of polyethylene blends comprising high density polyethylene and LLDPE, EXCEED XP™ 8656.
Figure 5:
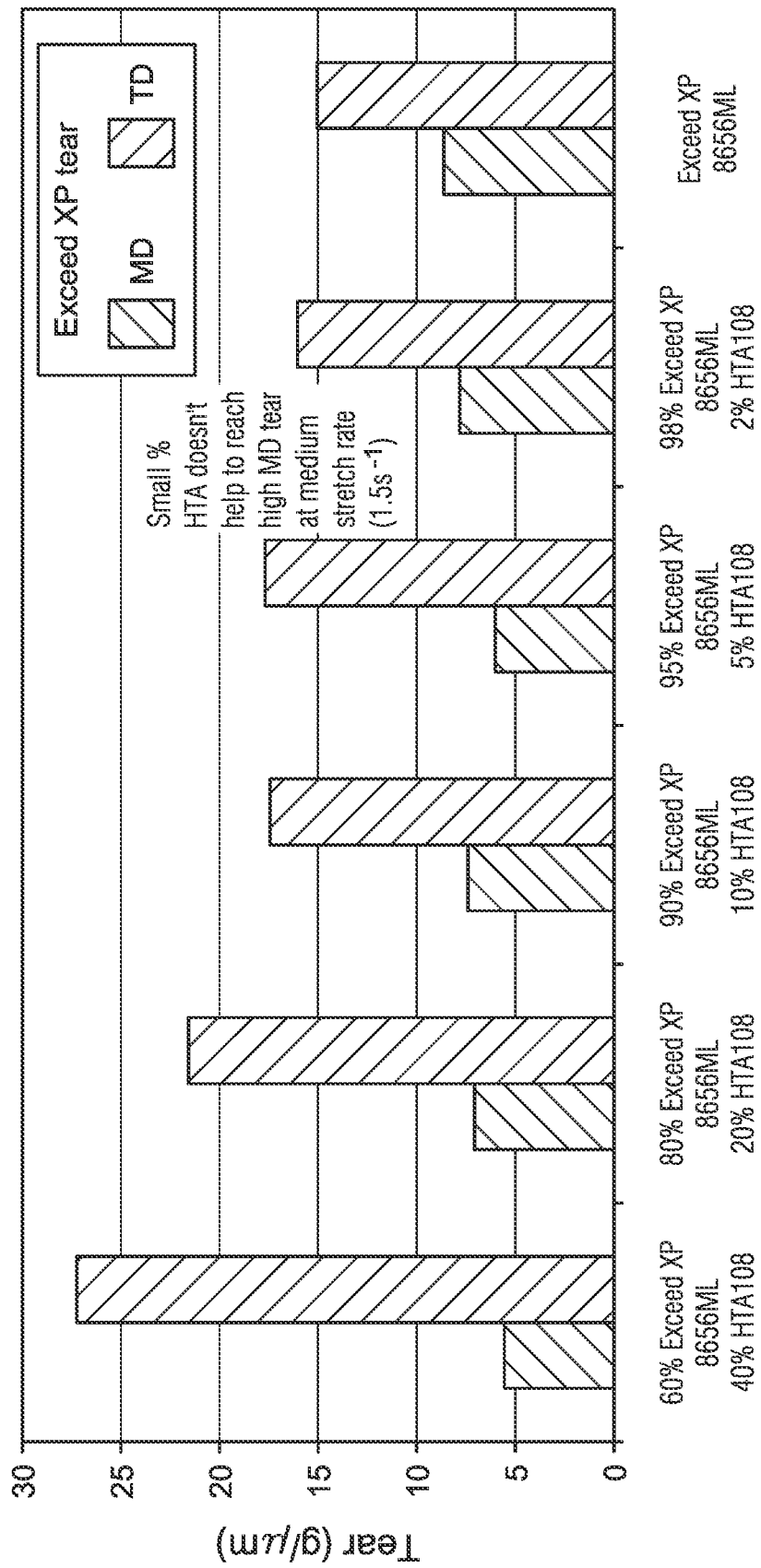
FIG. 5 are bar graphs of in 25 μm films with increased amounts of high density polyethylene in the polyethylene blend of a core layer where MD tear is not significantly affected.
Figure 6:
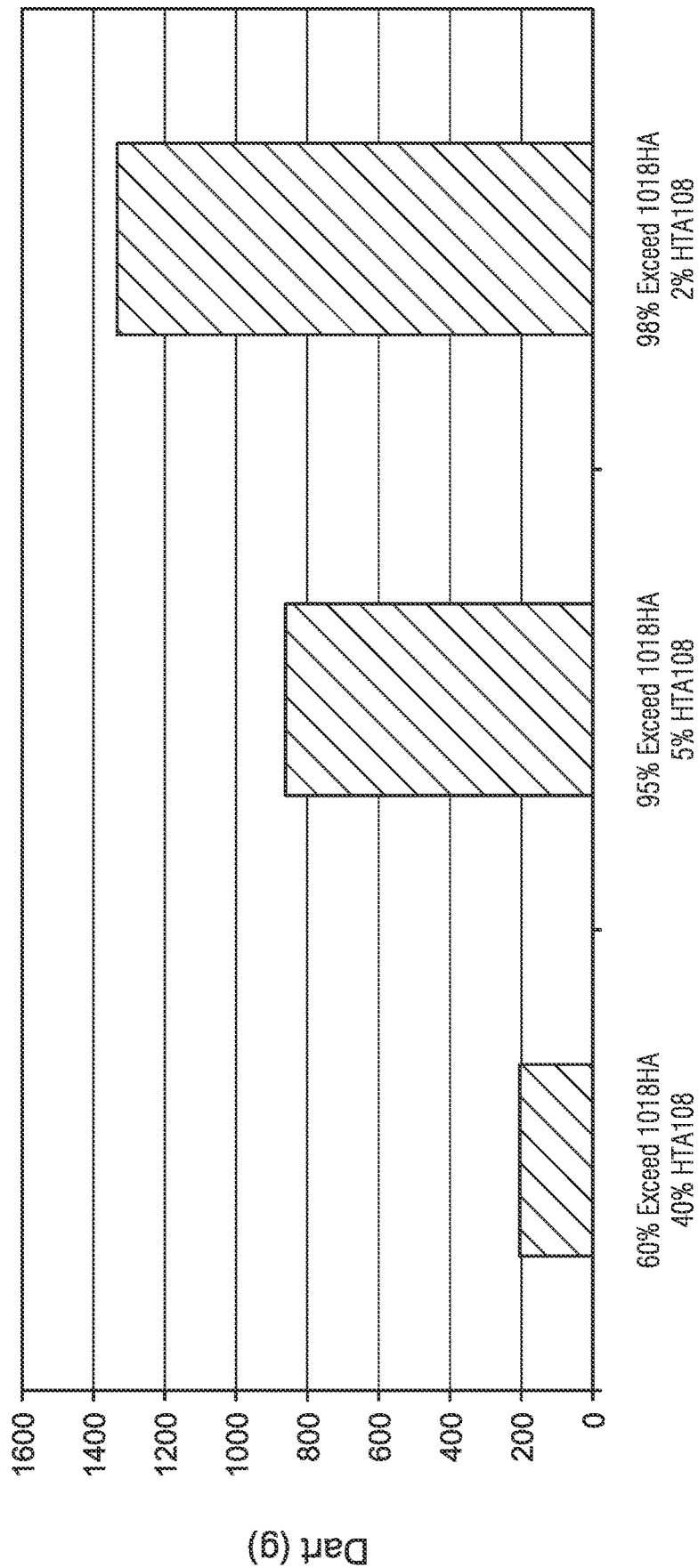
FIG. 6 are bar graphs of polyethylene blends comprising EXCEED 1018™ showing dart impact decreasing when increasing the amount of high density polyethylene composition in the polyethylene blend.

FIGS. 4 and 5 show that the dart impact and MD tear performance were retained in the three-layer film when the polyethylene blend of the core comprised EXCEED XP™ and had an increasing weight percent of the high density polyethylene composition. Comparatively, as shown in FIG. 6, a decrease of dart impact in the film was shown when the polyethylene blend comprised EXCEED™ 1018 and the amount of high density polyethylene was increased.

Example 4

Mono Coextruded Films

Coextruded films were produced having a layer distribution of 1/2/6/2/1 (to approximate 1/2/1). Each film had a thickness of 50 μm and was made with polyethylene blends comprising high density polyethylene composition (HTA 108) in an amount between about 0 wt. % to about 20 wt. % in the skin and subskin.

Figure 7:
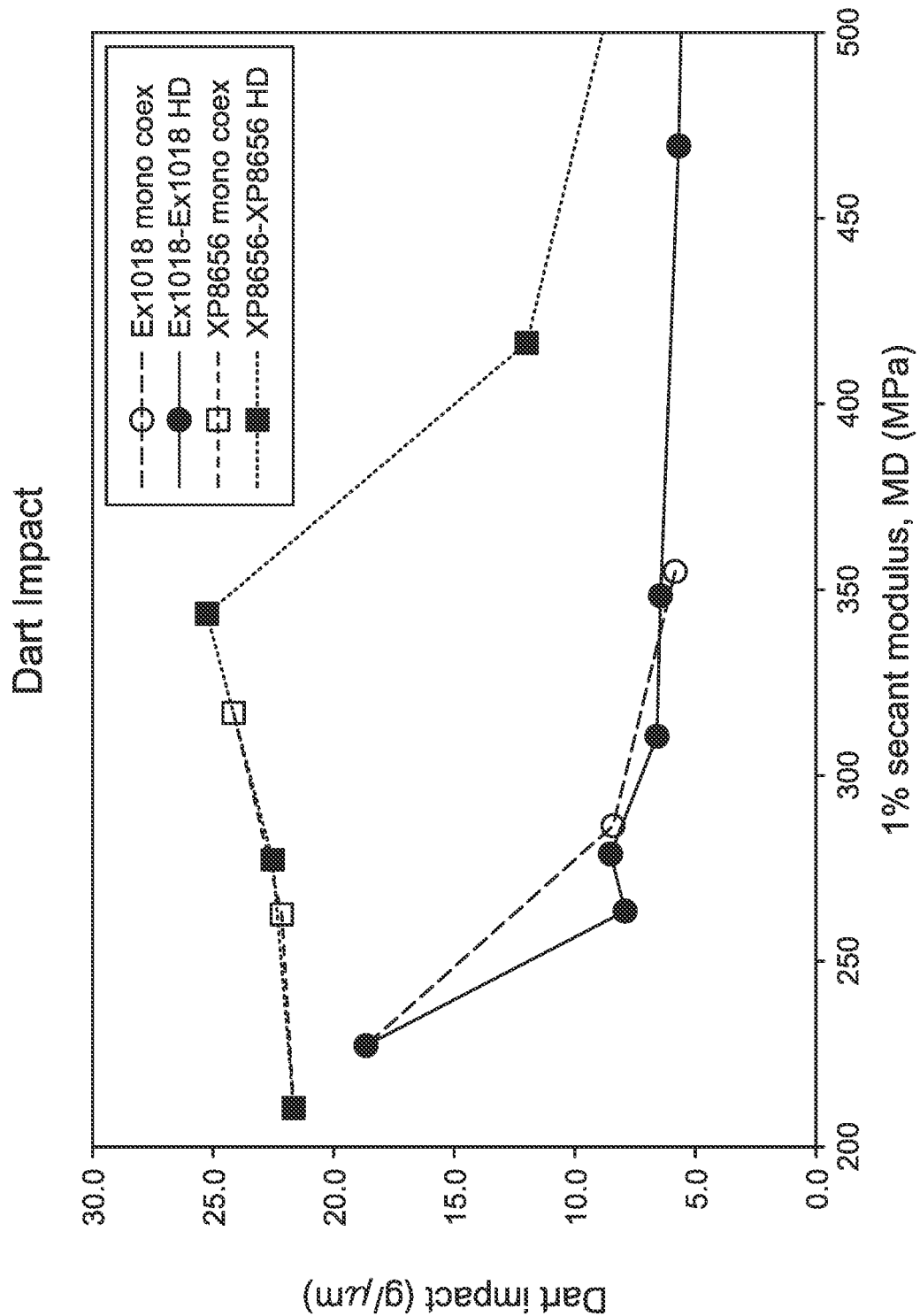
FIG. 7 is a plot that showing the dart impact trends of polyethylene blends comprising EXCEED XP™ 8656 having an increasing % HDPE in all film layers versus polyethylene blends comprising EXCEED™ 1018.
Figure 8:
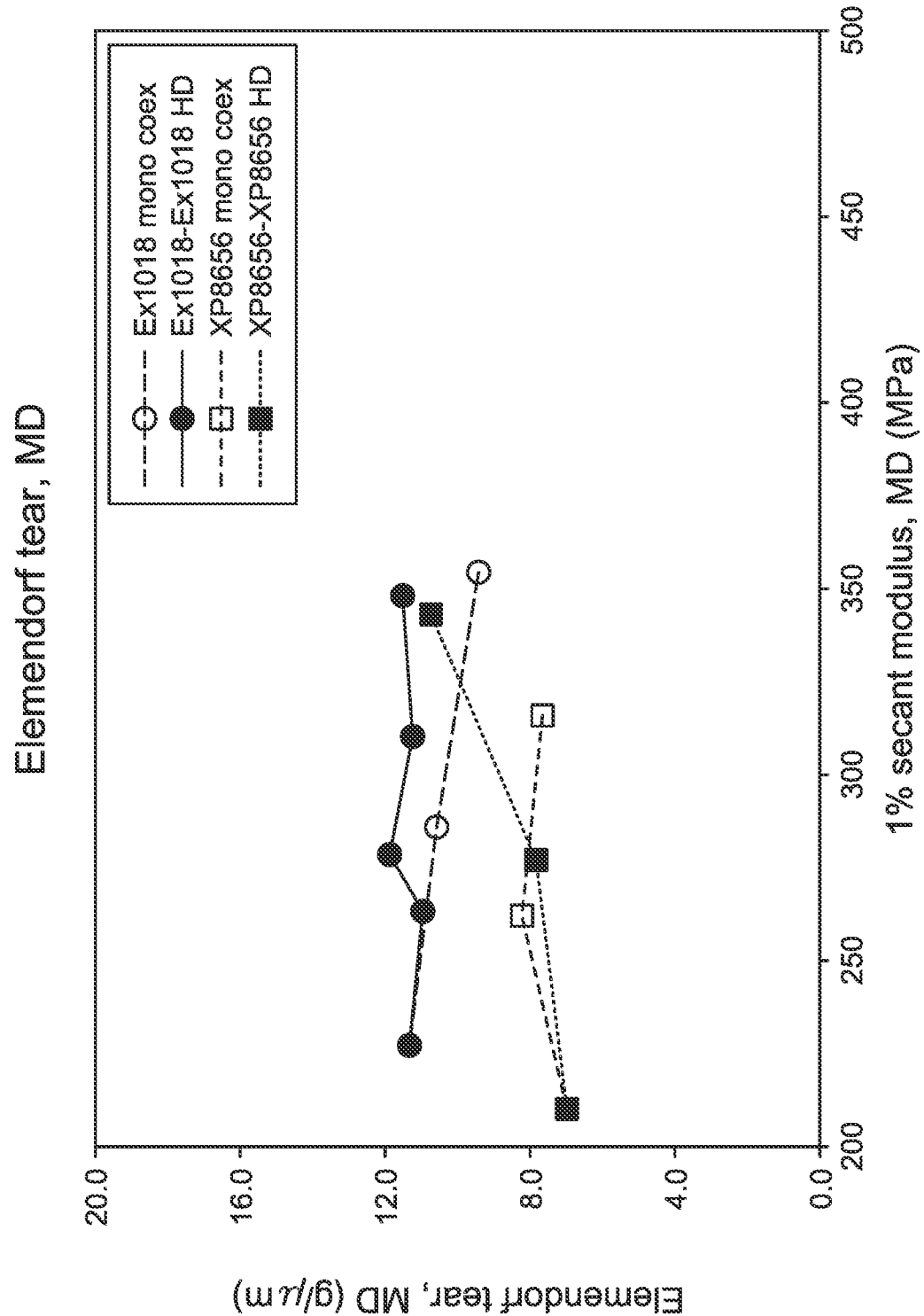
FIG. 8 is a plot that showing the MD Tear trends of films having a core layer comprising EXCEED XP™ 8656 with increasing % HDPE composition in each layer versus films comprising EXCEED™ 1018.

FIGS. 7 and 8 show the dart impact and MD tear of these films, when the high density polyethylene composition was added to the polyethylene blend in the core only or in the core, skin, and subskin. The results confirmed that the synergy is a result of the polyethylene blend used to produce the core (as demonstrated above in the films of Example 1). Adding high density polyethylene composition to polyethylene blends used to make outer layers of the film increases the required sealing time and heat. However, addition of the high density polyethylene compositions solely in the core is advantageous for manufacturing purposes. The different compositions of the film layers are provided in FIGS. 7 and 8, and shown below in Table 4.

TABLE 4

Layer Compositions

| Skins* | Exceed™ 1018 + 0/10/20% HTA 108 | Exceed™ 1018 | Exceed XP™ 8656 + 0/20% HTA 108 | Exceed XP™ 8656 |
|---|---|---|---|---|
| Core* | Exceed™ 1018 + 0/10/20% HTA 108 | Exceed™ 1018 0/15/20/30/40% HTA 108 | Exceed XP™ 8656 + 0/20% HTA 108 | Exceed XP™ 8656 + 0/20/40% HTA 108 |

*Additives information: Skins: 1.5% Antiblock F15 + 1% PBCE 505E Slip // Core: 1% PBCE 505E Slip Example 5

Core Blending in Films

In this example coextruded films were produced with a layer distribution of 1/2/6/2/1 (to approximate 1/2/1). The films each had a thickness of 50 μm and were made of polyethylene blends comprising between about 0 wt. % to about 100% high density polyethylene composition (HTA 108) in the core of the film.

Figure 9:
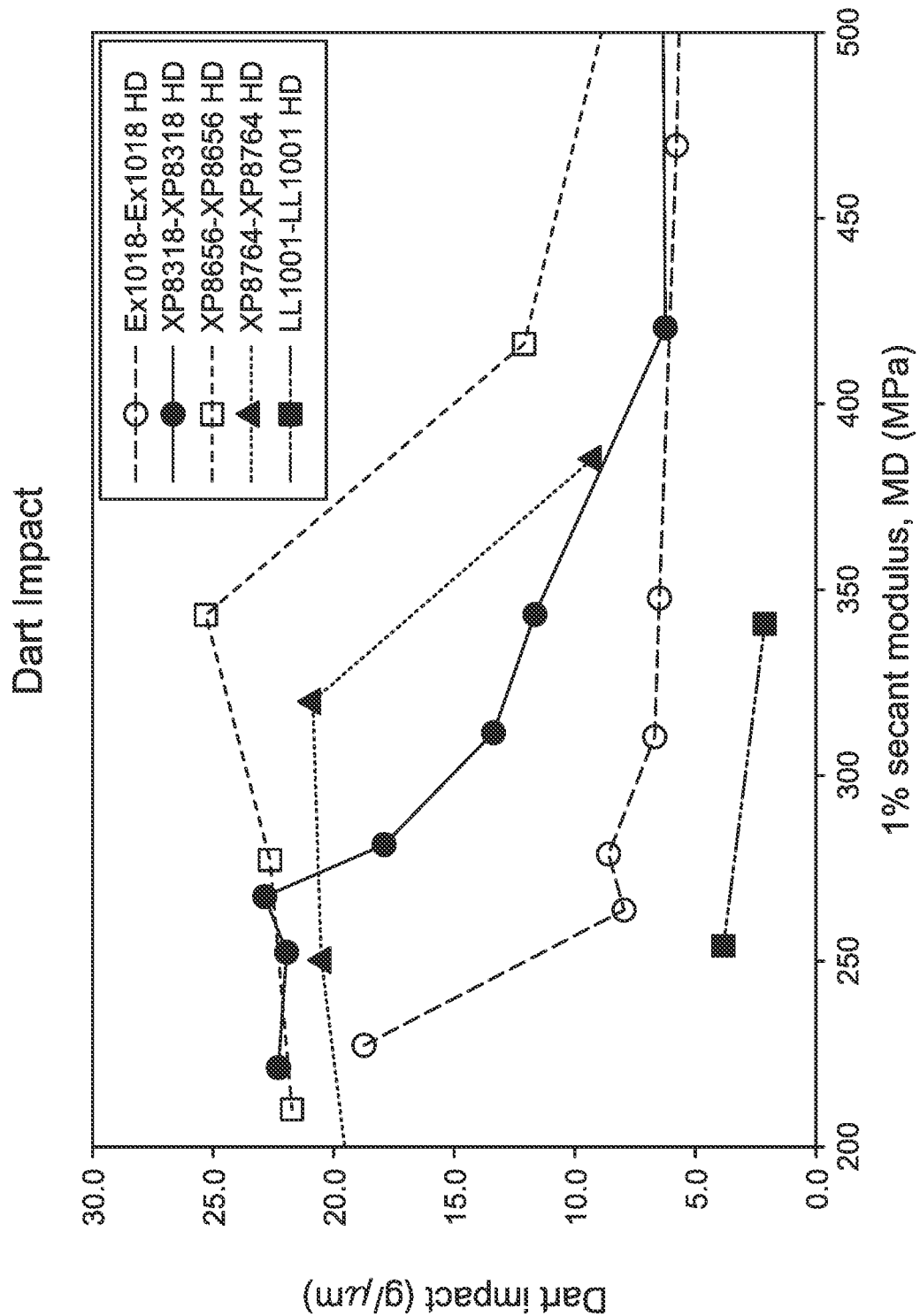
FIG. 9 is a plot showing the dart impact trends of films having a core layer comprising polyethylene blends of EXCEED XP™ and increasing % HDPE composition versus core layers comprising EXCEED™ 1018 and C4LL 1001.

FIG. 9 shows dart impact performance of different polyethylene composition grades, including EXCEED™ 1018 and C4LL 1001, decreased with increasing amount of the high density polyethylene composition, even at low concentrations. On the contrary, films made of polyethylene blends comprising the EXCEED XP™ polyethylene compositions retained dart impact performance even after addition of the high density polyethylene composition. Polyethylene blends comprising the LLDPE, EXCEED XP™ 8656, provided films that retained dart impact, even when up to 40 wt. % high impact polyethylene composition (HTA 108) was added to the polyethylene blend. The compositions of the film layers are shown in FIG. 9 and also in Table 5 below.

TABLE 5

Composition of Film Layers

| Skins* | Exceed™ 1018 | Exceed XP™ 8318 | Exceed XP™ 8656 | Exceed XP™ 8784 | C4LL 1001 |
|---|---|---|---|---|---|
| Core* | Exceed™ 1018 + 0/15/20/30/ | Exceed XP™ 8318 + 0/10/15/ | Exceed™ 8656 + 0/20/40/60% | Exceed XP™ 8784 + 0/20/ | C4LL 1001 + 0/40% |

TABLE 5-continued

Composition of Film Layers

| | 40/60/100% HTA 108 | 20/30/40/60/80/100% HTA 108 | HTA 108 | 40/60% HTA 108 | 108 |

Figure 10:
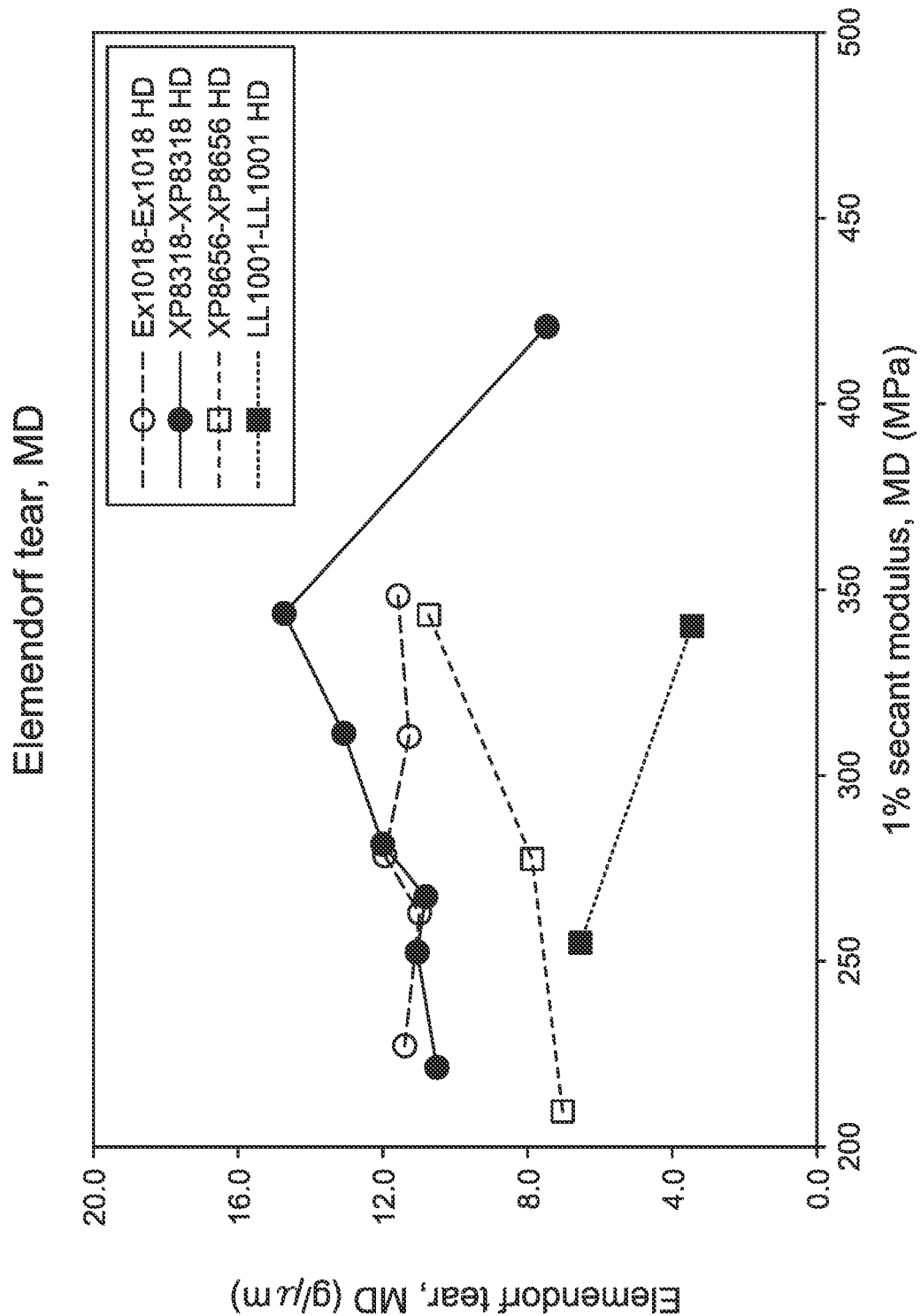
FIG. 10 is a plot showing the MD tear trends of films comprising EXCEED XP™ and increasing % HDPE composition in the core versus EXCEED™ 1018 and C4LL 1001.

*Additives information: Skins: 1.5% Antiblock F15 + 1% PBCE 505E Slip // Core: 1% PBCE 505E Slip As shown in FIG. 10, MD tear performance of polyethylene grades, such as EXCEED™ 1018, remained constant with increasing high density polyethylene composition content. In the case of C4LL 1001, the MD tear values dropped when adding HTA 108. On the contrary, polyethylene blends comprising EXCEED XP showed improved MD tear performance after the high density polyethylene composition addition. More specifically, polyethylene blends comprising EXCEED XP™ 8656 and EXCEED XP™ 8318 maintained or increased MD tear in films produced with such polyethylene blends, even when up to about 40 wt. % of high density polyethylene composition (HTA 108) was added to the polyethylene blend. The composition of the film layers are provided in Table 6 below.

TABLE 6

Film Layer Composition

| Skins* | Exceed™ 1018 | Exceed XP™ 8318 | Exceed XP™ 8656 | C4LL 1001 |
|---|---|---|---|---|
| Core* | Exceed™ 1018 + 0/15/20/30/40% HTA 108 | Exceed XP™ 8318 + 0/10/15/20/30/40/60% HTA 108 | Exceed XP™ 8656 + 0/20/40% HTA 108 | C4LL 1001 + 0/40% HTA 108 |

*Additives information: Skins: 1.5% Antiblock F15 + 1% PBCE 505E Slip // Core: 1% PBCE 505E Slip Example 6

Bag Drop on Stand-Up Pouch Samples

Co-extruded films were produced having a layer distribution of 1/2/6/2/1 (with same composition in skins and subskins to mimic 1/2/1). These films each had a thickness of 120 μm and were made from polyethylene blends of between about 0 wt. % to about 70 wt. % high density polyethylene composition (HTA 108) in the core.

Data for the bag drop/bending stiffness balance for bag samples made with polyethylene blends having varying amounts of high density polyethylene composition in the core and various polyethylene compositions in the skin and subskin are shown below in Table 7. "Comparative A" referred to a linear low density copolymer having a density of about 0.916 g/cm³ and an MI ($I_2$) of about 1.0 g/10 min.

As shown in Table 7, two bag samples had the core made of a polyethylene blend comprising about 70 wt. % high density polyethylene composition (HTA 108). Of the two bag samples, one comprised EXCEED XP™ 8656 and the other comprised Comparative A. A third bag sample had a core comprising about 25 wt. % high density polyethylene composition with Comparative A. The bags comprising Comparative A demonstrated bag drop survivals of 39% and 48%. The bag comprising only 25 wt. % high density polyethylene composition demonstrated a bending stiffness factor of 128.37 mm·N. The bag comprising EXCEED XP™

8656 and about 70 wt. % high density polyethylene composition in the core demonstrated a bending stiffness factor of 162 mm·N and a bag drop survival of about 80%. When the film core was made of a polyethylene blend comprising EXCEED XP™ 8656 and high density polyethylene composition, an exceptional bag drop/stiffness balance was shown—enough to downgauge.

TABLE 7

Bag Drop Test Results

| Layer distribution | 1/2/6/2/1 | 1/2/6/2/1 | 1/2/6/2/1 |
|---|---|---|---|
| Skins (outer and sub skin) | Comparative A | Exceed XP ™ 8656 | Comparative A |
| Core | Comparative A + 25% HDPE | Exceed XP ™ 8656 + 70% HDPE | Comparative A + 70% HDPE |
| Bending stiffness factor (mm · N) | 128 | 162 | 153 |
| Bag drop survival 5m (%) | 48 | 80 | 39 |
| Dart (g) | 811 | 1186 | 765 |

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A multilayer film comprising a core, a subskin disposed on the core, and a skin disposed on the subskin and having an Elmendorf tear in the machine direction (MD) greater than about 7.0 g/μm, a dart impact greater than about 6.0 g/μm, and a 1% secant modulus greater than about 200 MPa, wherein:
   the core comprises a first polyethylene blend comprising an ethylene 1-hexene copolymer having a density between about 0.914 g/cm$^3$ and about 0.918 g/cm$^3$, a melt index between about 0.50 g/10 min and about 1.0 g/10 min, and a CDBI between about 20% and about 55% and a high density polyethylene composition having a density between about 0.952 g/cm$^3$ and about 0.965 g/cm$^3$ and a melt index of about 0.70 g/10 min and about 4.0 g/10 min;
   the subskin comprises a second polyethylene blend comprising the ethylene 1-hexene copolymer; and
   the skin comprises a third polyethylene blend comprising the ethylene 1-hexene copolymer.

2. The multilayer film of claim 1, wherein the first polyethylene blend comprises between about 0 wt % and about 40 wt % of the high density polyethylene composition.

3. The multilayer film of claim 1, wherein the multilayer film has an Elmendorf tear in MD greater than about 12.0 g/μm, a dart impact greater than about 11.0 g/μm, and a 1% secant modulus between about 300 MPa and about 350 MPa.

4. The multilayer film of claim 1, wherein the multilayer film has an Elmendorf tear in MD greater than about 10.0 g/μm, a dart impact greater than about 21.0 g/μm, and a 1% secant modulus between about 220 MPa and about 260 MPa.

5. The multilayer film of claim 1, wherein the multilayer film has an Elmendorf tear in MD greater than about 8.0 g/μm, a dart impact greater than about 22.0 g/μm, and a 1% secant modulus between about 300 MPa and about 350 MPa.

6. The multilayer film of claim 1, having a dart impact greater than 10.0 g/μm, and further wherein:
   the first polyethylene blend comprises 60 to 100 wt % of the ethylene 1-hexene copolymer and 0 to 40 wt % of the high density polyethylene composition;
   the second polyethylene blend comprises 80 to 100 wt % of the ethylene 1-hexene copolymer and 0 to 20 wt % of the high density polyethylene composition; and
   the third polyethylene blend comprises 80 to 100 wt % of the ethylene 1-hexene copolymer and 0 to 20 wt % of the high density polyethylene composition.

7. The multilayer film of claim 1, wherein the multilayer film has a thickness greater than or equal to 25 microns.

8. The multilayer film of claim 7, wherein the multilayer film has a thickness between about 25 microns and about 100 microns.

9. The multilayer film of claim 8, wherein the film has a thickness of about 50 microns.

10. The multilayer film of claim 1, having a thickness of about 40 microns, and further wherein the high density polyethylene composition has density between 0.960 g/cm$^3$ and 0.961 g/cm$^3$.

11. The multilayer film of claim 1, wherein the core, subskin, and skin are co-extruded.

12. The multilayer film of claim 1, wherein the multilayer film comprises, by thickness, about 50% core, about 33.3% subskin, and about 16.7% skin.

13. The multilayer film of claim 1, wherein the core, subskin, and skin comprise 7 or fewer layers in total.

14. A multilayer film comprising a core, a subskin disposed on the core, and a skin disposed on the subskin, wherein;

the core comprises a first polyethylene blend comprising an ethylene 1-hexene copolymer having a density between about 0.912 g/cm$^3$ and about 0.929 g/cm$^3$, a melt index between about 0.50 g/10 min and about 2.4 g/10 min, and a CDBI between about 20% and about 55% and a high density polyethylene composition having a density of about 0.952 g/cm$^3$ and about 0.965 g/cm$^3$ and a melt index of about 0.70 g/10 min and about 4.0 g/10 min;

the subskin comprises a second polyethylene blend comprising the ethylene 1-hexene copolymer; and the skin comprises a third polyethylene blend comprising the ethylene 1-hexene copolymer, wherein;

the multilayer film comprises less than or equal to 30 wt. % of the high density polyethylene composition and the multilayer film has an Elmendorf tear in MD greater than about 7.0 g/μm, a dart impact greater than about 6.0 g/μm, and a 1% secant modulus greater than about 180 MPa.

15. A bag comprising the multilayer film of claim 1.

16. The bag of claim 15, wherein the bag has a bending stiffness factor greater than about 150 mm N and a bag drop survival at 5 m is between about 40% and about 80% as measured by ASTM 1709 Method A.

17. The bag of claim 15, wherein the bag comprises about 70 wt % of the high density polyethylene composition and wherein the ethylene 1-hexene copolymer has a density of about 0.916 g/cm$^3$ and a melt index of about 0.50 g/10 min.

18. The bag of claim 15, wherein the bag exhibits an improved bending stiffness factor and bag drop survival at 5 m relative to the same bag made from a linear low density copolymer of substantially similar melt index and density.

19. A laminate comprising (i) the multilayer film of claim 1, and (ii) a sealant disposed on the multilayer film.

20. The laminate of claim 19, wherein the sealant comprises an ethylene 1-hexene copolymer having a density of about 0.916 g/cm$^3$, a melt index of about 0.50 g/10 min, and a CDBI between about 20% and about 55%.

* * * * *